US011005682B2

(12) United States Patent
Chang et al.

(10) Patent No.: US 11,005,682 B2
(45) Date of Patent: May 11, 2021

(54) POLICY-DRIVEN SWITCH OVERLAY BYPASS IN A HYBRID CLOUD NETWORK ENVIRONMENT

(71) Applicant: Cisco Technology, Inc., San Jose, CA (US)

(72) Inventors: David W. Chang, Milpitas, CA (US); Abhijit Patra, Saratoga, CA (US); Nagaraj A. Bagepalli, Fremont, CA (US); Dileep Kumar Devireddy, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 533 days.

(21) Appl. No.: 14/876,627

(22) Filed: Oct. 6, 2015

(65) Prior Publication Data
US 2017/0099188 A1    Apr. 6, 2017

(51) Int. Cl.
| | | |
|---|---|---|
| *H04L 12/24* | (2006.01) | |
| *H04L 12/46* | (2006.01) | |
| *H04L 29/08* | (2006.01) | |
| *H04L 29/06* | (2006.01) | |
| *H04L 29/12* | (2006.01) | |

(52) U.S. Cl.
CPC ........ *H04L 12/4633* (2013.01); *H04L 63/102* (2013.01); *H04L 63/20* (2013.01);
(Continued)

(58) Field of Classification Search
USPC ........... 709/223–229; 370/30, 254, 360, 392, 370/419–422
See application file for complete search history.

(56) References Cited

U.S. PATENT DOCUMENTS

| | | |
|---|---|---|
| 5,812,773 A | 9/1998 | Norin |
| 5,889,896 A | 3/1999 | Meshinsky et al. |

(Continued)

FOREIGN PATENT DOCUMENTS

| | | |
|---|---|---|
| CN | 101719930 | 6/2010 |
| CN | 101394360 | 7/2011 |

(Continued)

OTHER PUBLICATIONS

Cisco Systems, Inc., "Cisco Intercloud Fabric: Hybrid Cloud with Choice, Consistency, Control and Compliance," Dec. 10, 2014.

(Continued)

*Primary Examiner* — Younes Naji
*Assistant Examiner* — Da T Ton
(74) *Attorney, Agent, or Firm* — Polsinelli PC

(57) ABSTRACT

Network policies can be used to optimize the flow of network traffic between virtual machines (VMs) in a hybrid cloud environment. In an example embodiment, one or more policies can drive a virtual switch controller, a hybrid cloud manager, a hypervisor manager, a virtual switch, or other orchestrator to create one or more direct tunnels that can be utilized by a respective pair of VMs to bypass the virtual switch and enable direct communication between the VMs. The virtual switch can send the VMs network and security policies to ensure that these policies are enforced. The VMs can exchange security credentials in order to establish the direct tunnel. The direct tunnel can be used by the VMs to bypass the virtual switch and allow the VMs to communicate with each other directly.

20 Claims, 8 Drawing Sheets

(52) U.S. Cl.
CPC .......... *H04L 67/10* (2013.01); *H04L 12/4641* (2013.01); *H04L 41/0896* (2013.01); *H04L 61/103* (2013.01); *H04L 61/6022* (2013.01)

(56) References Cited

U.S. PATENT DOCUMENTS

| | | | |
|---|---|---|---|
| 6,108,782 A | 8/2000 | Fletcher et al. | |
| 6,178,453 B1 | 1/2001 | Mattaway et al. | |
| 6,298,153 B1 | 10/2001 | Oishi | |
| 6,343,290 B1 | 1/2002 | Cossins et al. | |
| 6,643,260 B1 | 11/2003 | Kloth et al. | |
| 6,683,873 B1 | 1/2004 | Kwok et al. | |
| 6,721,804 B1 | 4/2004 | Rubin et al. | |
| 6,733,449 B1 | 5/2004 | Krishnamurthy et al. | |
| 6,735,631 B1 | 5/2004 | Oehrke et al. | |
| 6,885,670 B1 | 4/2005 | Regula | |
| 6,996,615 B1 | 2/2006 | McGuire | |
| 7,054,930 B1 | 5/2006 | Cheriton | |
| 7,058,706 B1 | 6/2006 | Lyer et al. | |
| 7,062,571 B1 | 6/2006 | Dale et al. | |
| 7,076,397 B2 | 7/2006 | Ding et al. | |
| 7,111,177 B1 | 9/2006 | Chauvel et al. | |
| 7,212,490 B1 | 5/2007 | Kao et al. | |
| 7,277,948 B2 | 10/2007 | Igarashi et al. | |
| 7,313,667 B1 | 12/2007 | Pullela et al. | |
| 7,379,846 B1 | 5/2008 | Williams et al. | |
| 7,480,672 B2 | 1/2009 | Hahn et al. | |
| 7,496,043 B1 | 2/2009 | Leong et al. | |
| 7,536,476 B1 | 5/2009 | Alleyne | |
| 7,567,504 B2 | 7/2009 | Darling et al. | |
| 7,606,147 B2 | 10/2009 | Luft et al. | |
| 7,647,594 B2 | 1/2010 | Togawa | |
| 7,684,322 B2 | 3/2010 | Sand et al. | |
| 7,773,510 B2 | 8/2010 | Back et al. | |
| 7,808,897 B1 | 10/2010 | Mehta et al. | |
| 7,881,957 B1 | 2/2011 | Cohen et al. | |
| 7,917,647 B2 | 3/2011 | Cooper et al. | |
| 8,010,598 B2 | 8/2011 | Tanimoto | |
| 8,028,071 B1 | 9/2011 | Mahalingam et al. | |
| 8,041,714 B2 | 10/2011 | Aymeloglu et al. | |
| 8,121,117 B1 | 2/2012 | Amdahl et al. | |
| 8,171,415 B2 | 5/2012 | Appleyard et al. | |
| 8,234,377 B2 | 7/2012 | Cohn | |
| 8,244,559 B2 | 8/2012 | Horvitz et al. | |
| 8,250,215 B2 | 8/2012 | Stienhans et al. | |
| 8,280,880 B1 | 10/2012 | Aymeloglu et al. | |
| 8,284,664 B1 | 10/2012 | Aybay et al. | |
| 8,284,776 B2 | 10/2012 | Petersen | |
| 8,301,746 B2 | 10/2012 | Head et al. | |
| 8,345,692 B2 | 1/2013 | Smith | |
| 8,406,141 B1 | 3/2013 | Couturier et al. | |
| 8,407,413 B1 | 3/2013 | Yucel et al. | |
| 8,448,171 B2 | 5/2013 | Donnellan et al. | |
| 8,477,610 B2 | 7/2013 | Zuo et al. | |
| 8,495,252 B2 | 7/2013 | Lais et al. | |
| 8,495,356 B2 | 7/2013 | Ashok et al. | |
| 8,510,469 B2 | 8/2013 | Portolani | |
| 8,514,868 B2 | 8/2013 | Hill | |
| 8,532,108 B2 | 9/2013 | Li et al. | |
| 8,533,687 B1 | 9/2013 | Greifeneder et al. | |
| 8,547,974 B1 | 10/2013 | Guruswamy et al. | |
| 8,560,639 B2 | 10/2013 | Murphy et al. | |
| 8,560,663 B2 | 10/2013 | Baucke et al. | |
| 8,589,543 B2 | 11/2013 | Dutta et al. | |
| 8,590,050 B2 | 11/2013 | Nagpal et al. | |
| 8,611,356 B2 | 12/2013 | Yu et al. | |
| 8,612,625 B2 | 12/2013 | Andries et al. | |
| 8,630,291 B2 | 1/2014 | Shaffer et al. | |
| 8,639,787 B2 | 1/2014 | Lagergren et al. | |
| 8,656,024 B2 | 2/2014 | Krishnan et al. | |
| 8,660,129 B1 | 2/2014 | Brendel et al. | |
| 8,719,804 B2 | 5/2014 | Jain | |
| 8,775,576 B2 | 7/2014 | Hebert et al. | |
| 8,797,867 B1 | 8/2014 | Chen et al. | |
| 8,805,951 B1 | 8/2014 | Faibish et al. | |
| 8,850,182 B1 | 9/2014 | Fritz et al. | |
| 8,856,339 B2 | 10/2014 | Mestery et al. | |
| 8,909,780 B1 * | 12/2014 | Dickinson ........... H04L 61/2514 709/225 |
| 8,909,928 B2 | 12/2014 | Ahmad et al. | |
| 8,918,510 B2 | 12/2014 | Gmach et al. | |
| 8,924,720 B2 | 12/2014 | Raghuram et al. | |
| 8,930,747 B2 | 1/2015 | Levijarvi et al. | |
| 8,938,775 B1 | 1/2015 | Roth et al. | |
| 8,959,526 B2 | 2/2015 | Kansal et al. | |
| 8,977,754 B2 | 3/2015 | Curry, Jr. et al. | |
| 9,009,697 B2 | 4/2015 | Breiter et al. | |
| 9,015,324 B2 | 4/2015 | Jackson | |
| 9,043,439 B2 | 5/2015 | Bicket et al. | |
| 9,049,115 B2 | 6/2015 | Rajendran et al. | |
| 9,063,789 B2 | 6/2015 | Beaty et al. | |
| 9,065,727 B1 | 6/2015 | Liu et al. | |
| 9,075,649 B1 | 7/2015 | Bushman et al. | |
| 9,104,334 B2 | 8/2015 | Madhusudana et al. | |
| 9,164,795 B1 | 10/2015 | Vincent | |
| 9,167,050 B2 | 10/2015 | Durazzo et al. | |
| 9,201,701 B2 | 12/2015 | Boldyrev et al. | |
| 9,201,704 B2 | 12/2015 | Chang et al. | |
| 9,203,784 B2 | 12/2015 | Chang et al. | |
| 9,223,634 B2 | 12/2015 | Chang et al. | |
| 9,244,776 B2 | 1/2016 | Koza et al. | |
| 9,251,114 B1 | 2/2016 | Ancin et al. | |
| 9,264,478 B2 | 2/2016 | Hon et al. | |
| 9,313,048 B2 | 4/2016 | Chang et al. | |
| 9,361,192 B2 | 6/2016 | Smith et al. | |
| 9,380,075 B2 | 6/2016 | He et al. | |
| 9,432,294 B1 | 8/2016 | Sharma et al. | |
| 9,444,744 B1 | 9/2016 | Sharma et al. | |
| 9,473,365 B2 | 10/2016 | Melander et al. | |
| 9,503,530 B1 | 11/2016 | Niedzielski | |
| 9,558,078 B2 | 1/2017 | Farlee et al. | |
| 9,613,078 B2 | 4/2017 | Vermeulen et al. | |
| 9,628,471 B1 | 4/2017 | Sundaram et al. | |
| 9,632,858 B2 | 4/2017 | Sasturkar et al. | |
| 9,658,876 B2 | 5/2017 | Chang et al. | |
| 9,692,802 B2 | 6/2017 | Bicket et al. | |
| 9,727,359 B2 | 8/2017 | Tsirkin | |
| 9,736,063 B2 | 8/2017 | Wan et al. | |
| 9,755,858 B2 | 9/2017 | Bagepalli et al. | |
| 9,792,245 B2 | 10/2017 | Raghavan et al. | |
| 9,804,988 B1 | 10/2017 | Ayoub et al. | |
| 9,954,783 B1 | 4/2018 | Thirumurthi et al. | |
| 2002/0004900 A1 | 1/2002 | Patel | |
| 2002/0073337 A1 | 6/2002 | Ioele et al. | |
| 2002/0143928 A1 | 10/2002 | Maltz et al. | |
| 2002/0166117 A1 | 11/2002 | Abrams et al. | |
| 2002/0174216 A1 | 11/2002 | Shorey et al. | |
| 2003/0018591 A1 | 1/2003 | Komisky | |
| 2003/0056001 A1 | 3/2003 | Mate et al. | |
| 2003/0228585 A1 | 12/2003 | Inoko et al. | |
| 2004/0004941 A1 | 1/2004 | Malan et al. | |
| 2004/0095237 A1 | 5/2004 | Chen et al. | |
| 2004/0131059 A1 | 7/2004 | Ayyakad et al. | |
| 2004/0264481 A1 | 12/2004 | Darling et al. | |
| 2005/0060418 A1 | 3/2005 | Sorokopud | |
| 2005/0125424 A1 | 6/2005 | Herriott et al. | |
| 2006/0059558 A1 | 3/2006 | Selep et al. | |
| 2006/0104286 A1 | 5/2006 | Cheriton | |
| 2006/0120575 A1 | 6/2006 | Ahn et al. | |
| 2006/0126665 A1 | 6/2006 | Ward et al. | |
| 2006/0146825 A1 | 7/2006 | Hofstaedter et al. | |
| 2006/0155875 A1 | 7/2006 | Cheriton | |
| 2006/0168338 A1 | 7/2006 | Bruegl et al. | |
| 2006/0294207 A1 | 12/2006 | Barsness et al. | |
| 2007/0011330 A1 | 1/2007 | Dinker et al. | |
| 2007/0174663 A1 | 7/2007 | Crawford et al. | |
| 2007/0223487 A1 | 9/2007 | Kajekar et al. | |
| 2007/0242830 A1 | 10/2007 | Conrado et al. | |
| 2008/0005293 A1 | 1/2008 | Bhargava et al. | |
| 2008/0084880 A1 | 4/2008 | Dharwadkar | |
| 2008/0165778 A1 | 7/2008 | Ertemalp | |
| 2008/0198752 A1 | 8/2008 | Fan et al. | |
| 2008/0201711 A1 | 8/2008 | Amir Husain | |
| 2008/0235755 A1 | 9/2008 | Blaisdell et al. | |

(56) References Cited

U.S. PATENT DOCUMENTS

| | | |
|---|---|---|
| 2009/0006527 A1 | 1/2009 | Gingell, Jr. et al. |
| 2009/0010277 A1 | 1/2009 | Halbraich et al. |
| 2009/0019367 A1 | 1/2009 | Cavagnari et al. |
| 2009/0031312 A1 | 1/2009 | Mausolf et al. |
| 2009/0083183 A1 | 3/2009 | Rao et al. |
| 2009/0138763 A1 | 5/2009 | Arnold |
| 2009/0177775 A1 | 7/2009 | Radia et al. |
| 2009/0178058 A1 | 7/2009 | Stillwell, III et al. |
| 2009/0182874 A1 | 7/2009 | Morford et al. |
| 2009/0265468 A1 | 10/2009 | Annambhotla et al. |
| 2009/0265753 A1 | 10/2009 | Anderson et al. |
| 2009/0293056 A1 | 11/2009 | Ferris |
| 2009/0300608 A1 | 12/2009 | Ferris et al. |
| 2009/0313562 A1 | 12/2009 | Appleyard et al. |
| 2009/0323706 A1 | 12/2009 | Germain et al. |
| 2009/0328031 A1 | 12/2009 | Pouyadou et al. |
| 2010/0042720 A1 | 2/2010 | Stienhans et al. |
| 2010/0061250 A1 | 3/2010 | Nugent |
| 2010/0115341 A1 | 5/2010 | Baker et al. |
| 2010/0131765 A1 | 5/2010 | Bromley et al. |
| 2010/0191783 A1 | 7/2010 | Mason et al. |
| 2010/0192157 A1 | 7/2010 | Jackson et al. |
| 2010/0205601 A1 | 8/2010 | Abbas et al. |
| 2010/0211782 A1 | 8/2010 | Auradkar et al. |
| 2010/0217886 A1 | 8/2010 | Seren et al. |
| 2010/0293270 A1 | 11/2010 | Augenstein et al. |
| 2010/0318609 A1 | 12/2010 | Lahiri et al. |
| 2010/0325199 A1 | 12/2010 | Park et al. |
| 2010/0325257 A1 | 12/2010 | Goel et al. |
| 2010/0325441 A1 | 12/2010 | Laurie et al. |
| 2010/0333116 A1 | 12/2010 | Prahlad et al. |
| 2011/0016214 A1 | 1/2011 | Jackson |
| 2011/0035754 A1 | 2/2011 | Srinivasan |
| 2011/0055396 A1 | 3/2011 | Dehaan |
| 2011/0055398 A1 | 3/2011 | Dehaan et al. |
| 2011/0055470 A1 | 3/2011 | Portolani |
| 2011/0072489 A1 | 3/2011 | Parann-Nissany |
| 2011/0075667 A1 | 3/2011 | Li et al. |
| 2011/0110382 A1 | 5/2011 | Jabr et al. |
| 2011/0116443 A1 | 5/2011 | Yu et al. |
| 2011/0126099 A1 | 5/2011 | Anderson et al. |
| 2011/0138055 A1 | 6/2011 | Daly et al. |
| 2011/0145413 A1 | 6/2011 | Dawson et al. |
| 2011/0145657 A1 | 6/2011 | Bishop et al. |
| 2011/0173303 A1 | 7/2011 | Rider |
| 2011/0185063 A1 | 7/2011 | Head et al. |
| 2011/0199902 A1 | 8/2011 | Leavy et al. |
| 2011/0213687 A1 | 9/2011 | Ferris et al. |
| 2011/0213966 A1 | 9/2011 | Fu et al. |
| 2011/0219434 A1 | 9/2011 | Betz et al. |
| 2011/0231715 A1 | 9/2011 | Kunii et al. |
| 2011/0231899 A1 | 9/2011 | Pulier et al. |
| 2011/0239039 A1 | 9/2011 | Dieffenbach et al. |
| 2011/0252327 A1 | 10/2011 | Awasthi et al. |
| 2011/0261811 A1 | 10/2011 | Battestilli et al. |
| 2011/0261828 A1* | 10/2011 | Smith .............. H04L 49/70 370/401 |
| 2011/0276675 A1 | 11/2011 | Singh et al. |
| 2011/0276951 A1 | 11/2011 | Jain |
| 2011/0295998 A1 | 12/2011 | Ferris et al. |
| 2011/0305149 A1 | 12/2011 | Scott et al. |
| 2011/0307531 A1 | 12/2011 | Gaponenko et al. |
| 2011/0320870 A1 | 12/2011 | Kenigsberg et al. |
| 2012/0005724 A1 | 1/2012 | Lee |
| 2012/0023418 A1 | 1/2012 | Frields et al. |
| 2012/0054367 A1 | 3/2012 | Ramakrishnan et al. |
| 2012/0072318 A1 | 3/2012 | Akiyama et al. |
| 2012/0072578 A1 | 3/2012 | Alam |
| 2012/0072581 A1 | 3/2012 | Tung et al. |
| 2012/0072985 A1 | 3/2012 | Davne et al. |
| 2012/0072992 A1 | 3/2012 | Arasaratnam et al. |
| 2012/0084445 A1 | 4/2012 | Brock et al. |
| 2012/0084782 A1 | 4/2012 | Chou et al. |
| 2012/0096134 A1 | 4/2012 | Suit |
| 2012/0102193 A1 | 4/2012 | Rathore et al. |
| 2012/0102199 A1 | 4/2012 | Hopmann et al. |
| 2012/0131174 A1 | 5/2012 | Ferris et al. |
| 2012/0137215 A1 | 5/2012 | Kawara |
| 2012/0158967 A1 | 6/2012 | Sedayao et al. |
| 2012/0159097 A1 | 6/2012 | Jennas, II et al. |
| 2012/0166649 A1 | 6/2012 | Watanabe et al. |
| 2012/0167094 A1 | 6/2012 | Suit |
| 2012/0173541 A1 | 7/2012 | Venkataramani |
| 2012/0173710 A1 | 7/2012 | Rodriguez |
| 2012/0179909 A1 | 7/2012 | Sagi et al. |
| 2012/0180044 A1 | 7/2012 | Donnellan et al. |
| 2012/0182891 A1 | 7/2012 | Lee et al. |
| 2012/0185632 A1 | 7/2012 | Lais et al. |
| 2012/0185913 A1 | 7/2012 | Martinez et al. |
| 2012/0192016 A1 | 7/2012 | Gotesdyner et al. |
| 2012/0192075 A1 | 7/2012 | Ebtekar et al. |
| 2012/0201135 A1 | 8/2012 | Ding et al. |
| 2012/0203908 A1 | 8/2012 | Beaty et al. |
| 2012/0204169 A1 | 8/2012 | Breiter et al. |
| 2012/0204187 A1 | 8/2012 | Breiter et al. |
| 2012/0214506 A1 | 8/2012 | Skaaksrud et al. |
| 2012/0222106 A1 | 8/2012 | Kuehl |
| 2012/0236716 A1 | 9/2012 | Anbazhagan et al. |
| 2012/0240113 A1 | 9/2012 | Hur |
| 2012/0265976 A1 | 10/2012 | Spiers et al. |
| 2012/0272025 A1 | 10/2012 | Park et al. |
| 2012/0281706 A1 | 11/2012 | Agarwal et al. |
| 2012/0281708 A1 | 11/2012 | Chauhan et al. |
| 2012/0290647 A1 | 11/2012 | Ellison et al. |
| 2012/0297238 A1 | 11/2012 | Watson et al. |
| 2012/0311106 A1 | 12/2012 | Morgan |
| 2012/0311568 A1 | 12/2012 | Jansen |
| 2012/0324092 A1 | 12/2012 | Brown et al. |
| 2012/0324114 A1 | 12/2012 | Dutta et al. |
| 2013/0003567 A1 | 1/2013 | Gallant et al. |
| 2013/0013248 A1 | 1/2013 | Brugler et al. |
| 2013/0036213 A1 | 2/2013 | Hasan et al. |
| 2013/0044636 A1 | 2/2013 | Koponen et al. |
| 2013/0066940 A1 | 3/2013 | Shao |
| 2013/0069950 A1 | 3/2013 | Adam et al. |
| 2013/0080509 A1 | 3/2013 | Wang |
| 2013/0080624 A1 | 3/2013 | Nagai et al. |
| 2013/0091557 A1 | 4/2013 | Gurrapu |
| 2013/0097601 A1 | 4/2013 | Podvratnik et al. |
| 2013/0104140 A1 | 4/2013 | Meng et al. |
| 2013/0111540 A1 | 5/2013 | Sabin |
| 2013/0117337 A1 | 5/2013 | Dunham |
| 2013/0124712 A1 | 5/2013 | Parker |
| 2013/0125124 A1 | 5/2013 | Kempf et al. |
| 2013/0138816 A1 | 5/2013 | Kuo et al. |
| 2013/0144978 A1 | 6/2013 | Jain et al. |
| 2013/0152076 A1 | 6/2013 | Patel |
| 2013/0152175 A1 | 6/2013 | Hromoko et al. |
| 2013/0159097 A1 | 6/2013 | Schory et al. |
| 2013/0159496 A1 | 6/2013 | Hamilton et al. |
| 2013/0160008 A1 | 6/2013 | Cawlfield et al. |
| 2013/0162753 A1 | 6/2013 | Hendrickson et al. |
| 2013/0169666 A1 | 7/2013 | Pacheco et al. |
| 2013/0179941 A1 | 7/2013 | McGloin et al. |
| 2013/0182712 A1 | 7/2013 | Aguayo et al. |
| 2013/0185413 A1 | 7/2013 | Beaty et al. |
| 2013/0185433 A1 | 7/2013 | Zhu et al. |
| 2013/0191106 A1 | 7/2013 | Kephart et al. |
| 2013/0198050 A1 | 8/2013 | Shroff et al. |
| 2013/0198374 A1 | 8/2013 | Zalmanovitch et al. |
| 2013/0204849 A1 | 8/2013 | Chacko |
| 2013/0232491 A1* | 9/2013 | Radhakrishnan ..... G06F 9/5077 718/1 |
| 2013/0232492 A1* | 9/2013 | Wang .................. G06F 9/4856 718/1 |
| 2013/0246588 A1 | 9/2013 | Borowicz et al. |
| 2013/0250770 A1 | 9/2013 | Zou et al. |
| 2013/0254415 A1 | 9/2013 | Fullen et al. |
| 2013/0262347 A1 | 10/2013 | Dodson |
| 2013/0268643 A1* | 10/2013 | Chang ................. G06F 9/4856 709/223 |
| 2013/0283364 A1 | 10/2013 | Chang et al. |
| 2013/0297769 A1 | 11/2013 | Chang et al. |
| 2013/0318240 A1 | 11/2013 | Hebert et al. |

(56) References Cited

U.S. PATENT DOCUMENTS

| | | |
|---|---|---|
| 2013/0318546 A1 | 11/2013 | Kothuri et al. |
| 2013/0339949 A1 | 12/2013 | Spiers et al. |
| 2014/0006481 A1 | 1/2014 | Frey et al. |
| 2014/0006535 A1 | 1/2014 | Reddy |
| 2014/0006585 A1 | 1/2014 | Dunbar et al. |
| 2014/0019639 A1 | 1/2014 | Ueno |
| 2014/0040473 A1 | 2/2014 | Ho et al. |
| 2014/0040883 A1 | 2/2014 | Tompkins |
| 2014/0052877 A1 | 2/2014 | Mao |
| 2014/0059310 A1 | 2/2014 | Du et al. |
| 2014/0074850 A1 | 3/2014 | Noel et al. |
| 2014/0075048 A1 | 3/2014 | Yuksel et al. |
| 2014/0075108 A1 | 3/2014 | Dong et al. |
| 2014/0075357 A1 | 3/2014 | Flores et al. |
| 2014/0075501 A1 | 3/2014 | Srinivasan et al. |
| 2014/0089727 A1 | 3/2014 | Cherkasova et al. |
| 2014/0098762 A1 | 4/2014 | Ghai et al. |
| 2014/0108985 A1 | 4/2014 | Scott et al. |
| 2014/0122560 A1 | 5/2014 | Ramey et al. |
| 2014/0136779 A1 | 5/2014 | Guha et al. |
| 2014/0140211 A1 | 5/2014 | Chandrasekaran et al. |
| 2014/0141720 A1 | 5/2014 | Princen et al. |
| 2014/0156557 A1 | 6/2014 | Zeng et al. |
| 2014/0160924 A1 | 6/2014 | Pfautz et al. |
| 2014/0164486 A1 | 6/2014 | Ravichandran et al. |
| 2014/0188825 A1 | 7/2014 | Muthukkaruppan et al. |
| 2014/0189095 A1 | 7/2014 | Lindberg et al. |
| 2014/0189125 A1 | 7/2014 | Amies et al. |
| 2014/0215471 A1 | 7/2014 | Cherkasova |
| 2014/0222953 A1 | 8/2014 | Karve et al. |
| 2014/0244851 A1 | 8/2014 | Lee |
| 2014/0245298 A1 | 8/2014 | Zhou et al. |
| 2014/0269266 A1 | 9/2014 | Filsfils et al. |
| 2014/0280805 A1 | 9/2014 | Sawalha |
| 2014/0282536 A1 | 9/2014 | Dave et al. |
| 2014/0282611 A1 | 9/2014 | Campbell et al. |
| 2014/0282669 A1 | 9/2014 | McMillan |
| 2014/0282889 A1 | 9/2014 | Ishaya et al. |
| 2014/0289200 A1 | 9/2014 | Kato |
| 2014/0297569 A1 | 10/2014 | Clark et al. |
| 2014/0297835 A1 | 10/2014 | Buys |
| 2014/0314078 A1 | 10/2014 | Jilani |
| 2014/0317261 A1 | 10/2014 | Shatzkamer et al. |
| 2014/0366155 A1 | 12/2014 | Chang et al. |
| 2014/0372567 A1 | 12/2014 | Ganesh et al. |
| 2015/0006470 A1 | 1/2015 | Mohan |
| 2015/0033086 A1 | 1/2015 | Sasturkar et al. |
| 2015/0043335 A1 | 2/2015 | Testicioglu et al. |
| 2015/0043576 A1 | 2/2015 | Dixon et al. |
| 2015/0052247 A1 | 2/2015 | Threefoot et al. |
| 2015/0052517 A1 | 2/2015 | Raghu et al. |
| 2015/0058382 A1 | 2/2015 | St. Laurent et al. |
| 2015/0058459 A1 | 2/2015 | Amendjian et al. |
| 2015/0058557 A1 | 2/2015 | Madhusudana et al. |
| 2015/0063102 A1* | 3/2015 | Mestery .................. H04L 41/50 370/230 |
| 2015/0070516 A1 | 3/2015 | Shoemake et al. |
| 2015/0071285 A1 | 3/2015 | Kumar et al. |
| 2015/0089478 A1 | 3/2015 | Cheluvaraju et al. |
| 2015/0100471 A1 | 4/2015 | Curry, Jr. et al. |
| 2015/0106802 A1 | 4/2015 | Ivanov et al. |
| 2015/0106805 A1 | 4/2015 | Melander et al. |
| 2015/0109923 A1 | 4/2015 | Hwang |
| 2015/0117199 A1 | 4/2015 | Chinnaiah Sankaran et al. |
| 2015/0117458 A1 | 4/2015 | Gurkan et al. |
| 2015/0120914 A1 | 4/2015 | Wada et al. |
| 2015/0149828 A1 | 5/2015 | Mukerji et al. |
| 2015/0178133 A1 | 6/2015 | Phelan et al. |
| 2015/0215819 A1 | 7/2015 | Bosch et al. |
| 2015/0227405 A1 | 8/2015 | Jan et al. |
| 2015/0242204 A1 | 8/2015 | Hassine et al. |
| 2015/0249709 A1 | 9/2015 | Teng et al. |
| 2015/0271199 A1 | 9/2015 | Bradley et al. |
| 2015/0280980 A1 | 10/2015 | Bitar |
| 2015/0281067 A1 | 10/2015 | Wu |
| 2015/0281113 A1 | 10/2015 | Siciliano et al. |
| 2015/0309908 A1 | 10/2015 | Pearson et al. |
| 2015/0319063 A1 | 11/2015 | Zourzouvillys et al. |
| 2015/0326524 A1 | 11/2015 | Tankala et al. |
| 2015/0339210 A1 | 11/2015 | Kopp et al. |
| 2015/0373108 A1 | 12/2015 | Fleming et al. |
| 2015/0379062 A1 | 12/2015 | Vermeulen et al. |
| 2016/0011925 A1 | 1/2016 | Kulkarni et al. |
| 2016/0013990 A1 | 1/2016 | Kulkarni et al. |
| 2016/0062786 A1 | 3/2016 | Meng et al. |
| 2016/0065417 A1 | 3/2016 | Sapuram et al. |
| 2016/0094398 A1 | 3/2016 | Choudhury et al. |
| 2016/0094480 A1 | 3/2016 | Kulkarni et al. |
| 2016/0094643 A1 | 3/2016 | Jain et al. |
| 2016/0094894 A1 | 3/2016 | Inayatullah et al. |
| 2016/0099847 A1 | 4/2016 | Melander et al. |
| 2016/0099873 A1 | 4/2016 | Gero et al. |
| 2016/0103838 A1 | 4/2016 | Sainani et al. |
| 2016/0105393 A1 | 4/2016 | Thakkar et al. |
| 2016/0127184 A1 | 5/2016 | Bursell |
| 2016/0134557 A1 | 5/2016 | Steinder et al. |
| 2016/0147676 A1 | 5/2016 | Cha et al. |
| 2016/0162436 A1 | 6/2016 | Raghavan et al. |
| 2016/0164914 A1 | 6/2016 | Madhav et al. |
| 2016/0188527 A1* | 6/2016 | Cherian .................. H04L 45/74 709/212 |
| 2016/0234071 A1 | 8/2016 | Nambiar et al. |
| 2016/0239399 A1 | 8/2016 | Babu et al. |
| 2016/0253078 A1 | 9/2016 | Ebtekar et al. |
| 2016/0254968 A1 | 9/2016 | Ebtekar et al. |
| 2016/0261564 A1 | 9/2016 | Foxhoven et al. |
| 2016/0277368 A1 | 9/2016 | Narayanaswamy et al. |
| 2016/0292611 A1 | 10/2016 | Boe et al. |
| 2016/0352682 A1 | 12/2016 | Chang |
| 2016/0378389 A1 | 12/2016 | Hrischuk et al. |
| 2017/0005948 A1 | 1/2017 | Melander et al. |
| 2017/0024260 A1 | 1/2017 | Chandrasekaran et al. |
| 2017/0026470 A1 | 1/2017 | Bhargava et al. |
| 2017/0034199 A1 | 2/2017 | Zaw |
| 2017/0041342 A1 | 2/2017 | Efremov et al. |
| 2017/0054659 A1* | 2/2017 | Ergin .................. H04L 45/38 |
| 2017/0063674 A1 | 3/2017 | Maskalik et al. |
| 2017/0097841 A1 | 4/2017 | Chang et al. |
| 2017/0104755 A1 | 4/2017 | Arregoces et al. |
| 2017/0126583 A1 | 5/2017 | Xia |
| 2017/0147297 A1 | 5/2017 | Krishnamurthy et al. |
| 2017/0163569 A1 | 6/2017 | Koganti |
| 2017/0171158 A1 | 6/2017 | Hoy et al. |
| 2017/0192823 A1 | 7/2017 | Karaje et al. |
| 2017/0264663 A1 | 9/2017 | Bicket et al. |
| 2017/0302521 A1 | 10/2017 | Lui et al. |
| 2017/0310556 A1 | 10/2017 | Knowles et al. |
| 2017/0317932 A1 | 11/2017 | Paramasivam |
| 2017/0339070 A1 | 11/2017 | Chang et al. |
| 2018/0069885 A1 | 3/2018 | Patterson et al. |
| 2018/0173372 A1 | 6/2018 | Greenspan et al. |
| 2018/0174060 A1 | 6/2018 | Velez-Rojas et al. |

FOREIGN PATENT DOCUMENTS

| | | |
|---|---|---|
| CN | 102164091 | 8/2011 |
| CN | 104320342 | 1/2015 |
| CN | 105740084 | 7/2016 |
| EP | 2228719 | 9/2010 |
| EP | 2439637 | 4/2012 |
| EP | 2645253 | 11/2014 |
| KR | 10-2015-0070676 | 5/2015 |
| TW | 394537 | 12/2010 |
| WO | WO 2009/155574 | 12/2009 |
| WO | WO 2010/030915 | 3/2010 |
| WO | WO 2013/158707 | 10/2013 |

OTHER PUBLICATIONS

Author Unknown, "5 Benefits of a Storage Gateway in the Cloud," Blog, TwinStrata, Inc., Jul. 25, 2012, XP055141645, 4 pages, https://web.archive.org/web/20120725092619/http://blog.twinstrata.com/2012/07/101/5-benefits-of-a-storage-gateway-in-the-cloud.

(56) References Cited

OTHER PUBLICATIONS

Author Unknown, "Joint Cisco and VMWare Solution for Optimizing Virtual Desktop Delivery: Data Center 3.0: Solutions to Accelerate Data Center Virtualization," Cisco Systems, Inc. and VMware, Inc., Sep. 2008, 10 pages.
Author Unknown, "Open Data Center Alliance Usage: Virtual Machine (VM) Interoperability in a Hybrid Cloud Environment Rev. 1.2," Open Data Center Alliance, Inc., 2013, 18 pages.
Author Unknown, "Real-Time Performance Monitoring on Juniper Networks Devices, Tips and Tools for Assessing and Analyzing Network Efficiency," Juniper Networks, Inc., May 2010, 35 pages.
Beyer, Steffen, "Module "Data::Locations?!"," Yapc::Europe, London, UK,ICA, Sep. 22-24, 2000, XP002742700, 15 pages.
Borovick, Lucinda, et al., "Architecting the Network for the Cloud," IDC White Paper, Jan. 2011, 8 pages.
Bosch, Greg, "Virtualization," last modified Apr. 2012 by B. Davison, 33 pages.
Broadcasters Audience Research Board, "What's Next," http://Iwww.barb.co.uk/whats-next, accessed Jul. 22, 2015, 2 pages.
Cisco Systems, Inc. "Best Practices in Deploying Cisco Nexus 1000V Series Switches on Cisco UCS B and C Series Cisco UCS Manager Servers," Cisco White Paper, Apr. 2011, 36 pages, http://www.cisco.com/en/US/prod/collateral/switches/ps9441/ps9902/white_paper_c11-558242.pdf.
Cisco Systems, Inc., "Cisco Unified Network Services: Overcome Obstacles to Cloud-Ready Deployments," Cisco White Paper, Jan. 2011, 6 pages.
Cisco Technology, Inc., "Cisco Expands Videoscape TV Platform Into the Cloud," Jan. 6, 2014, Las Vegas, Nevada, Press Release, 3 pages.
CSS Corp, "Enterprise Cloud Gateway (ECG)—Policy driven framework for managing multi-cloud environments," original published on or about Feb. 11, 2012; 1 page; http://www.css-cloud.com/platform/enterprise-cloud-gateway.php.
Fang K., "LISP MAC-EID-TO-RLOC Mapping (LISP based L2VPN)," Network Working Group, Internet Draft, Cisco Systems, Jan. 2012, 12 pages.
Herry, William, "Keep It Simple, Stupid: OpenStack nova-scheduler and its algorithm", May 12, 2012, IBM, 12 pages.
Hewlett-Packard Company, "Virtual context management on network devices", Research Disclosure, vol. 564, No. 60, Apr. 1, 2011, Mason Publications, Hampshire, GB, Apr. 1, 2011, 524.
Juniper Networks, Inc., "Recreating Real Application Traffic in Junosphere Lab," Solution Brief, Dec. 2011, 3 pages.
Kenhui, "Musings on Cloud Computing and IT-as-a-Service: [Updated for Havana] Openstack Computer for VSphere Admins, Part 2: Nova-Scheduler and DRS", Jun. 26, 2013, Cloud Architect Musings, 12 pages.
Kolyshkin, Kirill, "Virtualization in Linux," Sep. 1, 2006, XP055141648, 5 pages, https://web.archive.org/web/20070120205111/http://download.openvz.org/doc/openvz-intro.pdf.
Lerach, S.R.O., "Golem," http://www.lerach.cz/en/products/golem, accessed Jul. 22, 2015, 2 pages.
Linthicum, David, "VM Import could be a game changer for hybrid clouds", InfoWorld, Dec. 23, 2010, 4 pages.
Naik, Vijay K., et al., "Harmony: A Desktop Grid for Delivering Enterprise Computations," Grid Computing, 2003, Fourth International Workshop on Proceedings, Nov 17, 2003, pp. 1-11.
Nair, Srijith K. et al., "Towards Secure Cloud Bursting, Brokerage and Aggregation," 2012, 8 pages, www.flexiant.com.
Nielsen, "SimMetry Audience Measurement—Technology," http://www.nielsen-admosphere.eu/products-and-services/simmetry-audience-measurement-technology/, accessed Jul. 22, 2015, 6 pages.
Nielsen, "Television," http://www.nielsen.com/us/en/solutions/measurement/television.html, accessed Jul. 22, 2015, 4 pages.
Open Stack, "Filter Scheduler," updated Dec. 17, 2017, 5 pages, accessed on Dec. 18, 2017, https://docs.openstack.org/nova/latest/user/filter-scheduler.html.
Rabadan, J., et al., "Operational Aspects of Proxy-ARP/ND in EVPN Networks," BESS Worksgroup Internet Draft, draft-snr-bess-evpn-proxy-arp-nd-02, Oct. 6, 2015, 22 pages.
Saidi, Ali, et al., "Performance Validation of Network-Intensive Workloads on a Full-System Simulator," Interaction between Operating System and Computer Architecture Workshop, (IOSCA 2005), Austin, Texas, Oct. 2005, 10 pages.
Shunra, "Shunra for HP Software; Enabling Confidence in Application Performance Before Deployment," 2010, 2 pages.
Son, Jungmin, "Automatic decision system for efficient resource selection and allocation in inter-clouds," Jun. 2013, 35 pages.
Wikipedia, "Filter (software)", Wikipedia, Feb. 8, 2014, 2 pages, https://en.wikipedia.orq/w/index.php?title=Filter_%28software%29&oldid=594544359.
Wikipedia; "Pipeline (Unix)", Wikipedia, May 4, 2014, 4 pages, https://en.wikipedia.ord/w/index.php?title=Pipeline2/028Unix%29&oldid=606980114.
Amedro, Brian, et al., "An Efficient Framework for Running Applications on Clusters, Grids and Cloud," 2010, 17 pages.
Author Unknown, "A Look at DeltaCloud: The Multi-Cloud API," Feb. 17, 2012, 4 pages.
Author Unknown, "About Deltacloud," Apache Software Foundation, Aug. 18, 2013, 1 page.
Author Unknown, "Architecture for Managing Clouds, A White Paper from the Open Cloud Standards Incubator," Version 1.0.0, Document No. DSP-IS0102, Jun. 18, 2010, 57 pages.
Author Unknown, "Cloud Infrastructure Management Interface—Common Information Model (CIMI-CIM)," Document No. DSP0264, Version 1.0.0, Dec. 14, 2012, 21 pages.
Author Unknown, "Cloud Infrastructure Management Interface (CIMI) Primer," Document No. DSP2027, Version 1.0.1, Sep. 12, 2012, 30 pages.
Author Unknown, "cloudControl Documentation," Aug. 25, 2013, 14 pages.
Author Unknown, "Interoperable Clouds, A White Paper from the Open Cloud Standards Incubator," Version 1.0.0, Document No. DSP-IS0101, Nov. 11, 2009, 21 pages.
Author Unknown, "Microsoft Cloud Edge Gateway (MCE) Series Appliance," Iron Networks, Inc., 2014, 4 pages.
Author Unknown, "Use Cases and Interactions for Managing Clouds, A White Paper from the Open Cloud Standards Incubator," Version 1.0.0, Document No. DSP-ISO0103, Jun. 16, 2010, 75 pages.
Author Unknown, "Apache Ambari Meetup What's New," Hortonworks Inc., Sep. 2013, 28 pages.
Author Unknown, "Introduction," Apache Ambari project, Apache Software Foundation, 2014, 1 page.
CITRIX, "Citrix StoreFront 2.0" White Paper, Proof of Concept Implementation Guide, Citrix Systems, Inc., 2013, 48 pages.
Citrix, "CloudBridge for Microsoft Azure Deployment Guide," 30 pages.
Citrix, "Deployment Practices and Guidelines for NetScaler 10.5 on Amazon Web Services," White Paper, citrix.com, 2014, 14 pages.
Gedymin, Adam, "Cloud Computing with an emphasis on Google App Engine," Sep. 2011, 146 pages.
Good, Nathan A., "Use Apache Deltacloud to administer multiple instances with a single API," Dec. 17, 2012, 7 pages.
Kunz, Thomas, et al., "OmniCloud—The Secure and Flexible Use of Cloud Storage Services," 2014, 30 pages.
Logan, Marcus, "Hybrid Cloud Application Architecture for Elastic Java-Based Web Applications," F5 Deployment Guide Version 1.1, 2016, 65 pages.
Lynch, Sean, "Monitoring cache with Claspin" Facebook Engineering, Sep. 19, 2012, 5 pages.
Meireles, Fernando Miguel Dias, "Integrated Management of Cloud Computing Resources," 2013-2014, 286 pages.
Mu, Shuai, et al., "uLibCloud: Providing High Available and Uniform Accessing to Multiple Cloud Storages," 2012 IEEE, 8 pages.
Sun, Aobing, et al., "IaaS Public Cloud Computing Platform Scheduling Model and Optimization Analysis," Int. J. Communications, Network and System Sciences, 2011, 4, 803-811, 9 pages.
Szymaniak, Michal, et al., "Latency-Driven Replica Placement", vol. 47 No. 8, IPSJ Journal, Aug. 2006, 12 pages.

(56) References Cited

OTHER PUBLICATIONS

Toews, Everett, "Introduction to Apache jclouds," Apr. 7, 2014, 23 pages.
Von Laszewski, Gregor, et al., "Design of a Dynamic Provisioning System for a Federated Cloud and Bare-metal Environment," 2012, 8 pages.
Ye, Xianglong, et al., "A Novel Blocks Placement Strategy for Hadoop," 2012 IEEE/ACTS 11$^{th}$ International Conference on Computer and Information Science, 2012 IEEE, 5 pages.
Al-Harbi, S.H., et al., "Adapting κ-means for supervised clustering," Jun. 2006, Applied Intelligence, vol. 24, Issue 3, pp. 219-226.
Bohner, Shawn A., "Extending Software Change Impact Analysis into COTS Components," 2003, IEEE, 8 pages.
Hood, C. S., et al., "Automated Proactive Anomaly Detection," 1997, Springer Science and Business Media Dordrecht, pp. 688-699.
Vilalta R., et al., "An efficient approach to external cluster assessment with an application to martian topography," Feb. 2007, 23 pages, Data Mining and Knowledge Discovery 14.1: 1-23. New York: Springer Science & Business Media.

\* cited by examiner

POLICY-DRIVEN SWITCH OVERLAY BYPASS IN A HYBRID CLOUD NETWORK ENVIRONMENT

TECHNICAL FIELD

The subject matter of this disclosure relates in general to the field of computer networks, and more specifically for establishing policies to bypass a virtual switch overlay in a hybrid cloud network environment.

BACKGROUND

Industry trends indicate a growing movement among enterprises and other entities towards hybrid cloud architectures. These enterprises and other entities may be choosing such systems so that they can acquire additional on-demand computing, storage, and network resources, and eliminating the need to build for peak capacity within their own data centers. A potential advantage of leveraging public clouds is that they may not have the same initial capital investments that may be necessary to build out a company's own private data center. Another potential benefit for public cloud is that they may better absorb a company's need for elasticity by providing almost unlimited pay-as-you-grow expansion. Although hybrid cloud designs can be conceptually and financially attractive, enterprises may be reluctant to place mission-critical applications in the public cloud because of a perception that migrating workloads from an on-premises network to a public network may significantly reduce control, security, and efficiency of enterprise applications.

BRIEF DESCRIPTION OF THE DRAWINGS

In order to describe the manner in which the above-recited and other advantages and features of the disclosure can be obtained, a more particular description of the principles briefly described above will be rendered by reference to specific examples thereof which are illustrated in the appended drawings. Understanding that these drawings depict only examples of the disclosure and are not therefore to be considered to be limiting of its scope, the principles herein are described and explained with additional specificity and detail through the use of the accompanying drawings in which.

DESCRIPTION OF EXAMPLE EMBODIMENTS

Figure 1:
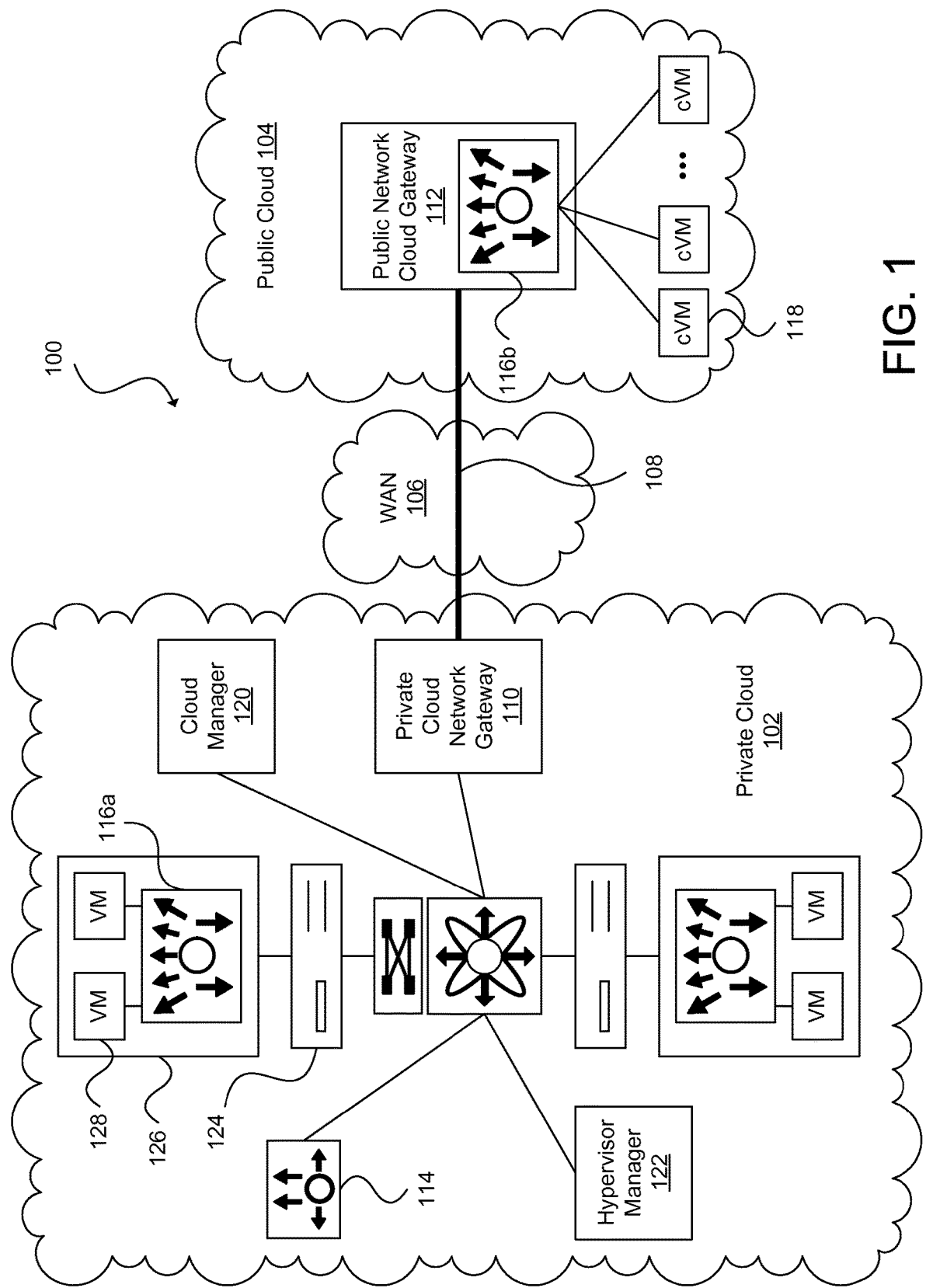
FIG. 1 illustrates an example hybrid cloud network environment that can be utilized in an example embodiment.

The detailed description set forth below is intended as a description of various configurations of example embodiments and is not intended to represent the only configurations in which the subject matter of this disclosure can be practiced. The appended drawings are incorporated herein and constitute a part of the detailed description. The detailed description includes specific details for the purpose of providing a more thorough understanding of the subject matter of this disclosure. However, it will be clear and apparent that the subject matter of this disclosure is not limited to the specific details set forth herein and may be practiced without these details. In some instances, structures and components are shown in block diagram form in order to avoid obscuring the concepts of the subject matter of this disclosure.

Overview

Network policies can be used to optimize the flow of network traffic between virtual machines (VMs) in a hybrid cloud environment. In an example embodiment, one or more policies can drive a virtual switch controller, a hybrid cloud manager, a hypervisor manager, a virtual switch, or other orchestrator to create one or more direct tunnels that can be utilized by a respective pair of VMs to bypass the virtual switch and enable direct communication between the VMs. The virtual switch can send the VMs network and security policies to ensure that these policies are enforced. The VMs can exchange security credentials in order to establish the direct tunnel. The direct tunnel can be used by the VMs to bypass the virtual switch and allow the VMs to communicate with each other directly.

DETAILED DESCRIPTION

A computer network is a geographically distributed collection of nodes interconnected by communication links and segments for transporting data between endpoints, such as personal computers and workstations. Many types of networks are available, with the types ranging from Local Area Networks (LANs) and Wide Area Networks (WANs) to overlay networks and Software-Defined Networks (SDNs).

LANs typically connect nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links. LANs and WANs can include layer 2 (L2) and/or layer 3 (L3) networks and devices.

The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol can refer to a set of rules defining how the nodes interact with each other. Computer networks may be further interconnected by an intermediate network node, such as a router, to extend the effective size of each network.

Overlay networks generally allow virtual networks to be created and layered over a physical network infrastructure. Overlay network protocols, such as Virtual Extensible LAN (VXLAN), Network Virtualization using Generic Routing Encapsulation (NVGRE), Network Virtualization Overlays (NVO3), and Stateless Transport Tunneling (STT), can provide a traffic encapsulation scheme to allow network traffic to be carried across L2 and L3 networks over a logical tunnel.

Overlay networks can also include virtual segments, such as VXLAN segments in a VXLAN overlay network, which can include virtual L2 and/or L3 overlay networks over which virtual machines (VMs) communicate. The virtual segments can be identified through a virtual network identifier (VNI), such as a VXLAN network identifier, which can specifically identify an associated virtual segment or domain.

Network virtualization allows hardware and software resources to be combined in a virtual network. For example, network virtualization can allow multiple numbers of VMs to be attached to the physical network via respective virtual LANs (VLANs). The VMs can be grouped according to their respective VLAN, and can communicate with other VMs as well as other devices on the internal or external network.

Cloud computing can also be provided in a network to provide computing services using shared resources. Cloud computing can generally include Internet-based computing in which computing resources are dynamically provisioned and allocated to client or user computers or other devices on-demand, from a collection of resources available via the network (e.g., "the cloud"). Cloud computing resources, for example, can include any type of resource, such as computing, storage, and networking, among others. For instance, resources may include service devices (firewalls, deep packet inspectors, traffic monitors, load balancers, etc.), compute/processing devices (servers, CPUs, GPUs, random access memory, caches, etc.), and storage devices (e.g., network attached storages, storage area network devices, hard disk drives, solid-state devices, etc.), among others. In addition, such resources may be used to support virtual networks, VMs, databases, applications ("apps"), etc.

Cloud computing resources may include a "private cloud," a "public cloud," and/or a "hybrid cloud." A "private cloud" can be a cloud infrastructure operated by an enterprise for use by the enterprise, while a "public cloud" can be a cloud infrastructure that provides services and resources over a network for public use. A "hybrid cloud" can be a cloud infrastructure composed of two or more clouds that inter-operate or federate through cloud orchestration, cloud management, cloud automation, or similar technologies. A hybrid cloud can be thought of as an interaction between private and public clouds where a private cloud joins a public cloud and utilizes public cloud resources in a secure and scalable manner.

FIG. 1 illustrates an example hybrid cloud network environment 100 that can be utilized in an example embodiment. Hybrid cloud network environment 100 can include a plurality of networks or clouds, such as a private cloud 102 (e.g., an enterprise virtual datacenter) and a public cloud 104 separated by a WAN 106, such as the Internet. Although a hybrid cloud is sometimes defined as consisting of a private cloud and a public cloud, it should be understood that many aspects of this disclosure can be practiced in various configurations (e.g., two or more public clouds hosted by third party cloud providers and/or two or more private clouds of an enterprise located in different locations). The private cloud 102 and the public cloud 104 can be integrated using overlay network techniques, such as VXLAN, NVGRE, NVO3, STT, or other overlay network protocols known to those of ordinary skill. The private cloud 102 and public cloud 104 can be connected via a site-to-site tunnel or communication link 108 between a private cloud network gateway 110 and a public cloud network gateway 112. The private cloud network gateway 110 can be configured as a VM for extending the private cloud across the Internet to the public cloud 104 through the site-to-site tunnel 108. The public cloud network gateway 112 can be configured as a VM switch overlay for interconnecting workloads running in the public cloud 104 via secure access tunnels, and for forwarding network traffic to the private network 102 using the site-to-site tunnel 108. In an example embodiment, the private cloud network gateway 110 can be implemented using Intercloud Fabric™ Extender (ICX) from Cisco®, Systems, Inc. of San Jose, Calif., the public cloud network gateway 112 can be implemented using Intercloud Fabric™ Switch (ICS) from Cisco®, and the ICX/ICS pair can form an Intercloud Fabric™ Cloud (ICFCloud).

In some example embodiments, the private cloud network gateway 110 can establish, from the private cloud 102, the secure site-to-site tunnel 108 to interconnect with the public cloud network gateway 112, and interact with a virtual switch controller or Virtual Supervisor Module (VSM) 114. The VSM 114 can serve as a network controller for managing the network and security policies of the overlay network. In an example embodiment, the VSM 114 can be implemented in an active-standby model to ensure high availability, with a first VSM functioning in a primary role and a second VSM functioning in a secondary role. If the first VSM fails, the second VSM can take over control. A virtual chassis model can be used to represent VSM 114 and each virtual switch or Virtual Ethernet Module (VEM) under the VSM's control or within the VSM's domain, such as VEM 116a in the private cloud and public cloud VEM 116b. The high availability pair of VSMs 114 can be associated with slot numbers 1 and 2 in the virtual chassis, and the VEMs 116a and 116b can be sequentially assigned to the remaining slots. In the virtual chassis model, VSM 114 may be configured to provide control plane functionality for the virtual switches or VEMs 116a and 116b. The VEMs 116a and 116b can provide network connectivity and switching capability for VMs hosted on a corresponding server like a line card in a modular switching platform, and can operate as part of a data plane associated with the control plane of VSM 114. Unlike multiple line cards in a single chassis, each VEM can act as an independent switch from a forwarding perspective. In some example embodiments, the VEMs 116a and 116b may form a distributed virtual switch that can be controlled by the VSM 114. In an example embodiment, the VSM 114 and VEMs 116a and 116b can be implemented using Cisco Nexus® 1000V Series Switches.

The private cloud 102 can also include a hybrid cloud manager 120, which can be a management plane VM for auto-provisioning resources within the hybrid cloud network environment 100. The hybrid cloud manager 120 can be a management platform running in the private cloud 102, and may be responsible for providing hybrid cloud operations, translating between private cloud and public cloud interfaces, managing cloud resources, instantiating cloud gateways and cloud VMs though a private virtualization platform or hypervisor manager 122 and public cloud provider application programming interfaces (APIs). The hybrid cloud manager 120 may also monitor the health of all of the components of the network (e.g., cloud gateways, VMs, and communication links) and ensure high availability of those components.

In an example embodiment, the hybrid cloud manager 120 can be implemented as a virtual appliance, such as the Intercloud Fabric™ Director (ICFD) from Cisco®. The ICFD can be a hybrid cloud orchestration component that can provide a single point of management and consumption of hybrid cloud resources. That is, the ICFD can offer a single console so that users can provision workloads and associated policies. The ICFD can also expose northbound APIs, which allow users to programmatically manage their workloads in the hybrid cloud environment 100 or integrate with other cloud management platforms.

The private cloud 102 can include one or more physical servers 124 that each deploy a hypervisor 126 (also sometimes referred to as a virtual machine manager or a virtual machine monitor (VMM)). The hypervisor 126 may be computer software, firmware, or hardware that creates and runs one or more VMs, such as VMs 128 or cVMs 118. Although the cVMs 118 are not shown to be encapsulated by a hypervisor in this example, it will be appreciated that VMs may or may not be managed by a hypervisor. The hypervisor 126 can provide a respective operating system to one or more VMs. In some example embodiments, the hypervisor 126 may be a native or "bare metal" hypervisor that runs directly on hardware, but that may alternatively run under host software executing on hardware. The hypervisor 126 can be managed by the virtualization platform or hypervisor manager 122, such as vSphere® from VMware®, Inc. of Palo Alto, Calif., Hyper-V® from Microsoft® Corp. of Seattle, Wash., XenServer® from Citrix® Systems, Inc. of Santa Clara, Calif., or Red Hat® Enterprise Virtualization from Red Hat®, Inc. of Raleigh, N.C.

Each VM, including VMs 128 and cVMs 118, can host a private application. In some example embodiments, each public cloud VM 118 may be connected to the public cloud network gateway 112 via secure access tunnels, as discussed elsewhere herein. In some example embodiments, one or more cVMs 118 can be configured to operate as a public cloud firewall (not shown), such as an Intercloud Fabric™ Firewall or Virtual Security Gateway (VSG) from Cisco®. In some example embodiments, one or more cVMs 118 can be configured to operate as a public cloud router (not shown), such as an Intercloud Fabric™ Router or Cloud Services Router (CSR) from Cisco®.

In some example embodiments, the public cloud network gateway 112 can establish, from the public cloud 104, the secure site-to-site tunnel 108 to interconnect with the private cloud network gateway 110, secure access tunnels to connect public cloud VMs (cVMs) 118, and monitor and report statistics for the public cloud VMs and any component failures in the public cloud 104. In some example embodiments, the private cloud network gateway 110 and the public cloud network gateway 112 can be deployed as a high-availability pair to provide redundancy. In some example embodiments, the public cloud network gateway 112 can include a cloud virtual switch or cloud Virtual Ethernet Module (cVEM) 116b that communicates with the VSM 114 to retrieve VM-specific network policies (e.g., port profiles), switches network traffic between public cloud VMs 118, switches network traffic between public cloud VMs and the private cloud 102, applies network policies, and monitors and reports VEM-related statistics.

In some example embodiments, each physical server, such as physical server 124, hosting a VM, including VM 128 and cVM 118, can include multiple Virtual Network Interface Cards (VNICs) (not shown) for providing specific functionality, such as control and/or data/packet transmission. For example, a VM on a physical server can include a vNIC that may be connected to a VEM, such as VEM 116a or cVEM 116b, for connecting the VM or cVM to the network. Each physical server 124 can include a vNIC for enabling control functionality, such as Small Computer Systems Interface over IP (iSCSI), Network File System (NFS) access, migration of VMs or cVMs, directly connected tunnels, discussed elsewhere herein, as well as other control functionality.

In some example embodiments, each public cloud VM 118 can include an agent (not shown) that provides for the network overlay logic for the public cloud VM. The agent can be deployed in the cVM as a secure tunnel driver. The agent can establish a secure access tunnel to connect the public cloud VM 118 to the public cloud network gateway 112, and monitor and report secure overlay-related statistics. In an example embodiment, the agent can be implemented using Intercloud Fabric™ Agent (ICA) from Cisco®.

In some example embodiments, the secure site-to-site tunnel or communication link 108 can take one of several forms, such as various types of virtual private networks (VPNs) or Layer 2 (L2) tunneling protocols. For example, some example embodiments may utilize an open VPN (e.g., OpenVPN) overlay or an IP Security (IPSec) VPN based L3 network extension to provide the communication link 108. Some example embodiments may utilize a secure transport layer (i.e., L4) tunnel as the communication link 108 between the private cloud network gateway 110 and the public cloud network gateway 112, where the secure transport layer tunnel 108 can be configured to provide a link layer (i.e., L2) network extension between the private cloud 102 and the public cloud 104. Some example embodiments may establish the secure transport layer (i.e., L4) tunnel 108 (e.g., Transport Layer Security (TLS), Datagram TLS (DTLS), Secure Socket Layer (SSL), etc.) over the public network 104, and can build a secure L2 switch overlay that interconnects public cloud resources with private clouds (e.g., enterprise network backbones). In other words, the secure transport layer tunnel 108 can provide a link layer network extension between the private cloud 102 and the public cloud 104.

In an example embodiment, the private cloud network gateway 110 can use an L4 secure tunnel as the communication link 108 to connect to the cloud resources allocated in the public cloud 104. The L4 secure tunnel may be well-suited for use with corporate firewalls and Network Address Translation (NAT) devices due to the nature of the transport level protocols (e.g., UDP/TCP) and the transport layer ports opened for HTTP/HTTPS in the firewall. The L2 network can thus be further extended and connected to each of the cloud VMs 118 through the public cloud network gateway 112. With an L2 network overlay, instances of a particular private application VM can be seamlessly migrated to the overlay network dynamically created in the public cloud 104, without substantial impact to existing corporate infrastructure.

Figure 2A:
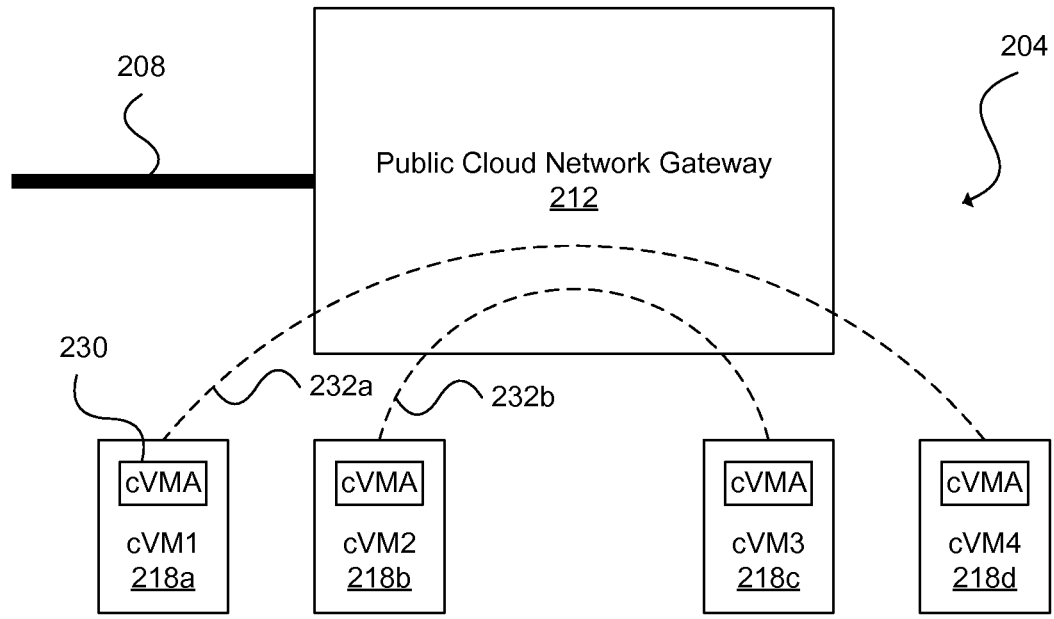
FIGS. 2A and 2B illustrate example approaches for distributing network traffic in a hybrid cloud environment that can be utilized in some example embodiments.
Figure 2B:
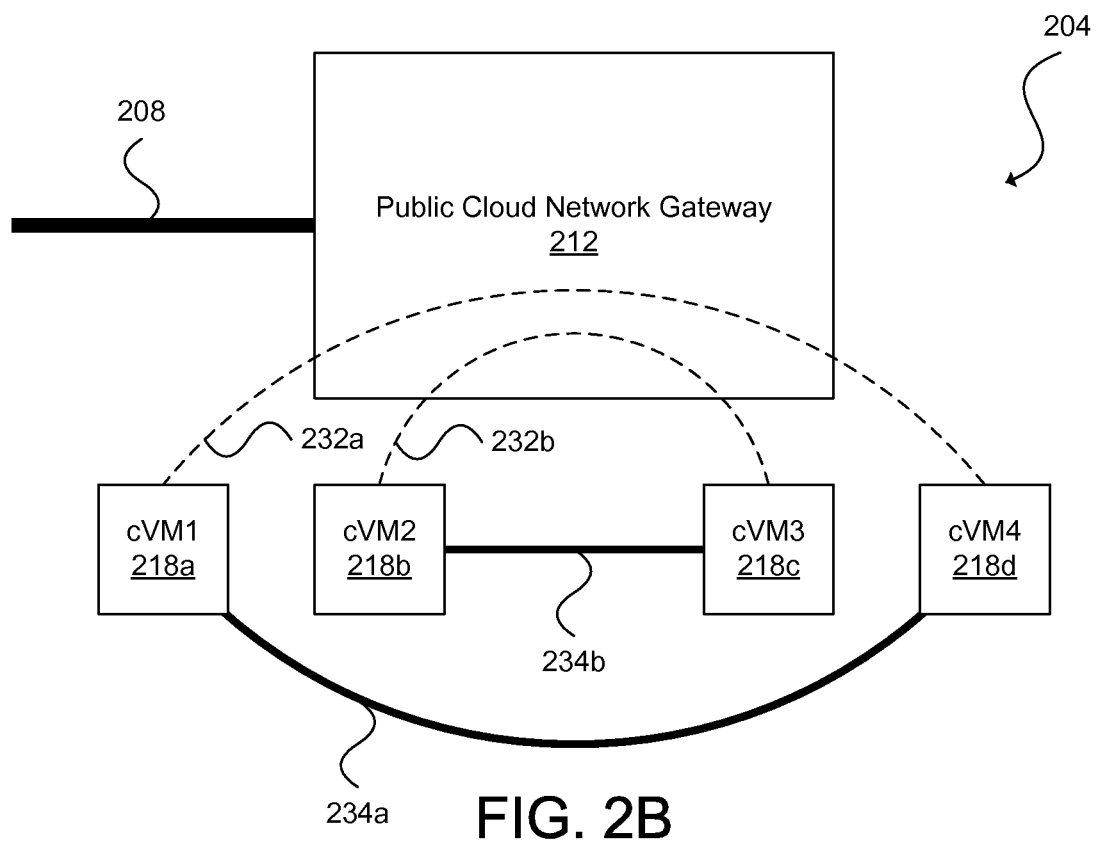

FIGS. 2A and 2B illustrate example approaches for distributing VM-to-VM network traffic in a public cloud 204 of a hybrid cloud network that can be utilized in some example embodiments. In FIG. 2A, the public cloud environment 204 can include a public cloud network gateway 212 and public cloud VMs 218a, 218b, 218c, and 218d. For example, a cloud manager (e.g., cloud manager 120 of FIG. 1) (not shown) can be used to deploy an intercloud fabric for integrating a private cloud (e.g., private cloud 102 of FIG. 1) (not shown) with a public cloud, such as the public cloud 204. The cloud manager can interface with a hypervisor manager (e.g., hypervisor manager 122 of FIG. 1) (not shown) to instantiate a VM (e.g., VM 128 of FIG. 1) (not shown) in the private cloud and configure the VM to operate as a private cloud network gateway (e.g., private cloud network gateway 110 of FIG. 1) (not shown). The cloud manager can also interface with a hypervisor manager in the public cloud 204 or cloud provider APIs to instantiate a plurality of public cloud VMs (e.g., cVMs 218a, 218b, 218c, or 218d). One or more of the cVMs can be configured to operate as the public cloud network gateway 212. One or more of the cVMs can be configured to operate as a public cloud firewall (not shown). One or more of the cVMs can be configured to operate as a public cloud router (not shown). One or more of the cVMs can be configured for migrating workloads from the private cloud to the public cloud 204.

The cloud manager can also establish a site-to-site tunnel or secure network extension 208 between the private cloud network gateway and the public cloud network gateway 212. As discussed, in some example embodiments, a public cloud VM agent 230 can be utilized to provide a compute environment and network overlay for the public cloud VMs 218a, 218b, 218c, and 218d. The cVMA 230 can be deployed in a public cloud VM as a secure tunnel driver that runs within the public cloud VM's operating system. The agent 230 can cause a cVM to direct network traffic to the secure overlay network by establishing a secure tunnel (e.g., access tunnels 232a and 232b) to connect to the public cloud network gateway 212 for allowing the cVMs to communicate with private cloud VMs and other public cloud VMs. The cVMA 230 can also collect secure overlay-related statistics.

In the public cloud 204, the access tunnel 232a can be used for secure communications between cVM 218a and 218d, and the access tunnel 232b can be used for secure communications between public cloud VM 218b and public cloud VM 218c. For instance, if the public cloud VM 218a desires to send a packet to the public cloud VM 218d, the packet can first be sent to the public cloud network gateway 212, where network and security policy may be enforced. Then the public cloud network gateway 212 may forward the packet to the cVM 218d. That is, packets sent between cVMs 218a and cVM 218d may pass through the public cloud network gateway 212 before arriving at the packets' intended destinations.

In certain situations, the public cloud network gateway 212 can become a bottleneck for a hybrid cloud network, such as when the public cloud network gateway is used to connect a large number of cVMs and/or large-sized cVMs. Under these circumstances, an alternative or additional process can be used for enabling communications between cVMs. FIG. 2B illustrates an example approach. In FIG. 2B, a direct connection or Directly Connected Tunnel (DCT) 234a may be established between cVM 218a and cVM 218d, and a direction connection or DCT 234b may be established between cVM 218b and 218c. Network traffic between cVMs 218a and 218d can bypass the public cloud network gateway 212 by transmitting the traffic through the directly connected tunnel 234a. Likewise, communications between cVMs 218b and 218c can bypass the public cloud network gateway 212 by sending the communications over the directly connected tunnel 234b.

As used herein, a direct connection or DCT can refer to a direct connection from an overlay network perspective rather than a direct physical connection. For example, cVMs 218a and 218d may not be directly connected to a same Ethernet (L2) hub, but can achieve L2 adjacency via VXLAN, NVGRE, NVO3, STT, or other suitable overlay network protocol. For instance, access tunnel 232a may be referred to as an indirect tunnel because traffic between cVMs 218a and 218d includes a hop over the public cloud network gateway 212. DCT 234a can be referred to as a direct tunnel because it does not include such hop. Although DCTs can reduce bandwidth requirements of the public cloud network gateway 212 and minimize the chances of the public cloud network gateway becoming a bottleneck for the hybrid cloud network, bypassing the public cloud network gateway may also result in network and security policy becoming unenforced.

Figure 3:
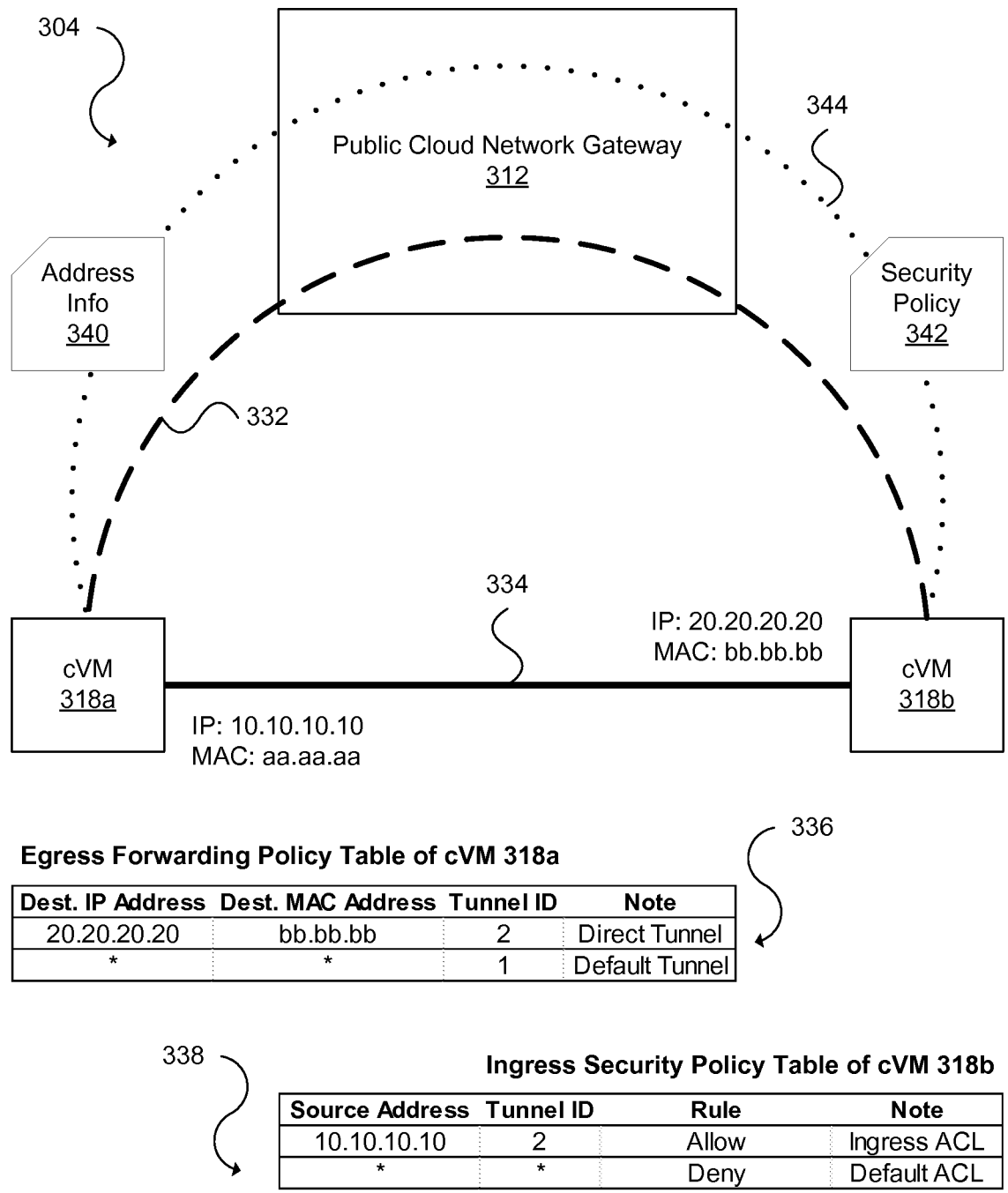
FIG. 3 further illustrates an example approach for forwarding network traffic and enforcing security policy in a network environment similar to that of FIG. 2B.

FIG. 3 further illustrates an example approach for forwarding network traffic and enforcing security policy in a network environment similar to that of FIG. 2B. In FIG. 3, the public cloud environment 304 can include a public cloud network gateway 312 interconnected with public cloud VMs 318a and 318b. The cVM 318a can be assigned IP address 10.10.10.10 and MAC address aa.aa.aa, and the cVM 318b can be assigned IP address 20.20.20.20 and MAC address bb.bb.bb. The cVMs 318a and 318b may be indirectly connected via a secure access tunnel 332. That is, traffic between these cVMs transmitted along the access tunnel at one endpoint of the access tunnel can include a hop over the public cloud network gateway 312 before arriving at the other end of the access tunnel. The secure access tunnel 332 can be associated with tunnel identifier 1. The cVMs 318a and 318b may also be directly connected via a direct connection or DCT 334. The DCT 334 can be associated with tunnel identifier 2.

By default, the cVMs 318a and 318b can communicate with each other through the secure access tunnel 332 (and through the public cloud network gateway 312). The public cloud network gateway 312 can establish the access tunnel 332 as a default access tunnel during the initial deployment of a cVM and have network traffic between cVMs pass through the public cloud network gateway as a default forwarding policy. For example, cVM 318a's egress forwarding table 336 can be initialized to include an entry of "*" or all addresses for the destination IP address, "*" or all addresses for the destination MAC address, and a tunnel identifier of 1 to indicate that cVM 318's egress traffic should be forwarded on the default access tunnel 1, i.e., forwarded to the public cloud network gateway 312. The cVM 318b can have a similar egress forwarding table including a similar default forwarding policy. In the example embodiment of FIG. 3, the cVM 318b may have a default security policy or Access Control List (ACL) that denies all incoming traffic, which can be represented in the cVM 318b's ingress security policy table 338 as an entry including "*" or all addresses for the source address, "*" or all tunnels for the tunnel identifier, and a "Deny" rule for dropping incoming traffic corresponding to the source address and source tunnel. The cVM 318a may include a similar ingress security policy table with a default security policy or ACL.

To optimize network traffic flow in the public cloud environment 304 and ensure that security policy is enforced, policies can be defined for connecting a first cVM to a second cVM via a DCT. In an example embodiment, a DCT policy can be on-demand or enforced when any cVM mutually connected to a same public cloud network gateway attempt to communicate with one another. For instance, the public cloud network gateway can be configured to orchestrate the creation of a DCT tunnel between a pair of cVMs based on an initial attempted cVM-to-cVM communication via a secure access tunnel, such as an Address Resolution Protocol (ARP) request. In another example embodiment, a DCT policy can be application-driven or enforced by a cloud orchestration component (e.g., the VSM 114 of FIG. 1, cloud manager 120 of FIG. 1, hypervisor manager 122 of FIG. 1, or other suitable management interface) based on application network profiles or requirements (e.g., Application Network Profiles (ANPs) in the Cisco Application Centric Infrastructure (Cisco ACI™)). For instance, the management interface can be utilized to configure a public cloud network gateway to set up one or more DCTs among a set of cVMs connected to the gateway based on the application network profiles or requirements.

In an example embodiment, a DCT policy can be statistics-driven or enforced according to metrics relating to the hybrid cloud network. For instance, a cVM agent and/or public cloud network gateway can monitor latency, bandwidth, throughput, response time, or other suitable processing and/or network performance measurement until such measurement is below a threshold, above a threshold, or otherwise satisfies a threshold condition. Upon satisfying the threshold condition, the public cloud network gateway can establish one or more DCTs to address the threshold condition. For example, a public cloud network gateway can be configured to create DCTs on-demand once CPU utilization reaches an upper bound and can revert to a previous network policy when CPU utilization is below a lower bound. As another example, a cVM agent can monitor and report network latency to a VSM (e.g., the VSM 114 of FIG. 1), cloud manager (e.g., cloud manager 120 of FIG. 1), hypervisor manager (e.g., hypervisor manager 122 of FIG. 1), or other suitable management interface. When network latency for the cVM reaches a minimum criterion, the management interface can direct the public cloud network gateway to establish one or more DCTs for that cVM to alleviate the network latency. In various example embodiments, other policies can be defined for establishing DCTs as would be known to one of ordinary skill in the art.

To establish the DCT 334 between the cVMs 318*a* and 316*b*, the public cloud network gateway 312 can send network address information and security information (e.g., keys credentials, certificates, or other authentication information) 340 relating to cVM 318*b* to the cVM 318*a* over the secure access tunnel 332. This can cause the egress forwarding policy table 336 to be updated with an entry, such as "20.20.20.20" for the destination IP address, "bb.bb.bb" for the destination MAC address, and tunnel identifier 2, indicating that traffic intended for the cVM 318*b* sent by the cVM 318*a* should be delivered over direct tunnel 334. The public cloud network gateway 312 can also send security policy information 342 to ensure applicable security policies are enforced. In this example, the security policy information 342 can cause the ingress security policy table 338 to be populated with an entry comprising "10.10.10.10" for a source address, tunnel identifier 2, and an "Allow" rule, which indicates that traffic originating from the source address sent over the DCT 334 can be accepted by the cVM 318*b*. In an example embodiment, physical servers hosting cVMs 318*a* and 318*b* can include control interfaces that can be used to form a control tunnel 344 between cVMs 318*a* and 318*b*. The first cVM's address and security information 340 and the second cVM's security policy information 342 can be sent over the control tunnel 344. In another example embodiment, such information can be sent over the secure access tunnel 332.

Figure 4:
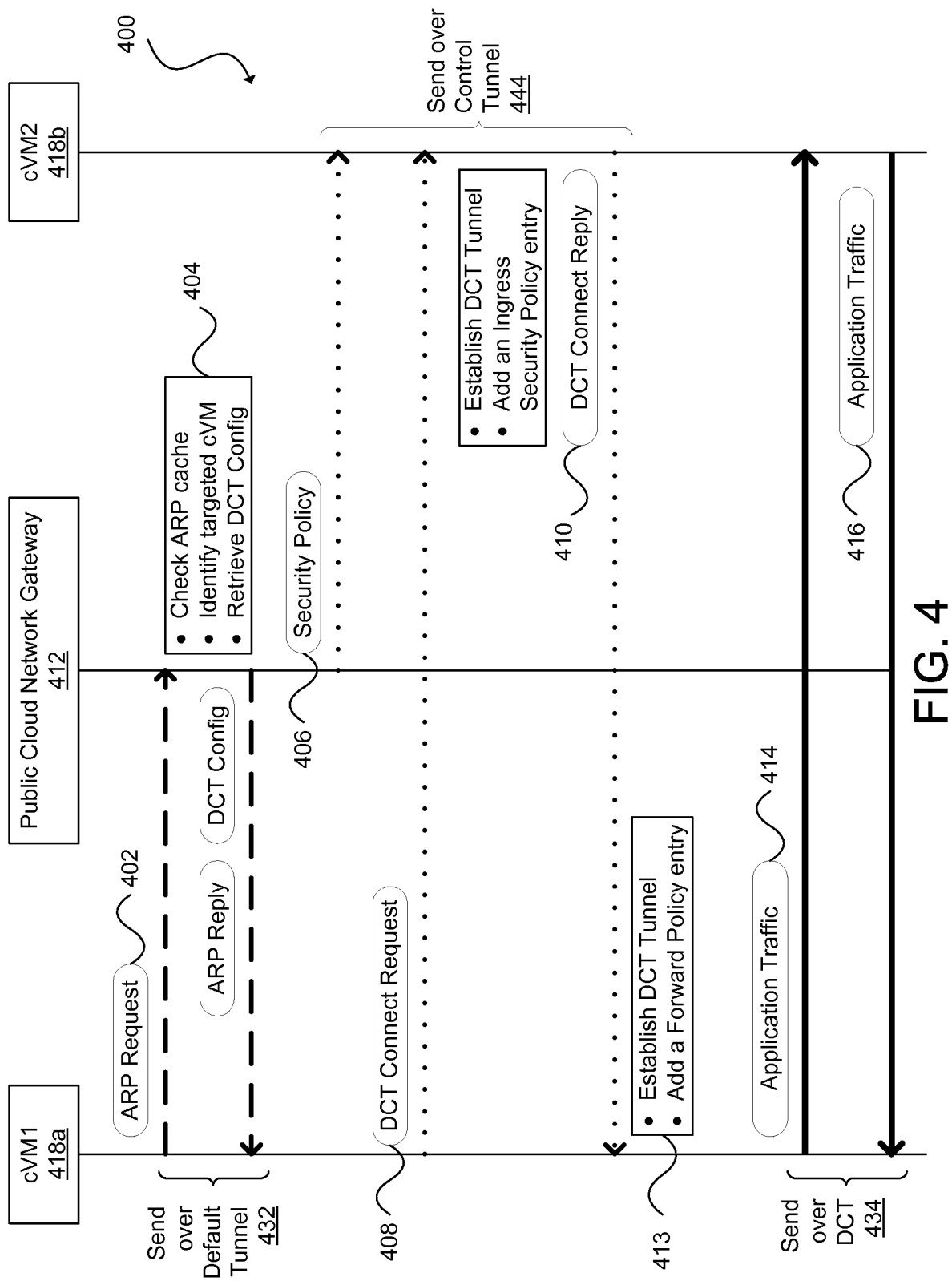
FIG. 4 illustrates an example data flow diagram for establishing communications between virtual machines in a hybrid cloud environment that can be utilized in an example embodiment.

FIG. 4 illustrates an example data flow diagram 400 for establishing communications between VMs in a hybrid cloud environment that can be utilized in an example embodiment. Data flow diagram 400 may be used for enforcing an on-demand DCT policy, such as when a network is configured to establish a DCT tunnel upon any attempted communication between cVMs connected to the gateway, or the network has defined a statistics-driven DCT policy and a threshold condition corresponding to the policy is satisfied. In this example embodiment, a first VM 418*a* and a second VM 418*b* are each connected to a virtual switch or public cloud network gateway 412. A secure access tunnel 432 can be established between the cVMs during their deployment. The access tunnel 432 can include a hop over the public cloud network gateway 412. The cVM 418*a*'s forwarding table (e.g., egress forwarding policy table 336 of FIG. 3) can be initialized with a default rule to send egress traffic to the public cloud network gateway 412 over the access tunnel 432. The cVM 418*b*'s forwarding table may include a similar entry. The respective physical servers hosting cVMs 418*a* and 418*b* may include respective control interfaces such that a control tunnel 444 can also be created between cVMs 418*a* and 418*b*.

The first cVM 418*a* can attempt to communicate with the second cVM 418*b*, and may begin at 402 by sending an ARP request to the virtual switch or public cloud network gateway 412 to determine network address information for the second cVM. The ARP request can be sent over the secure access tunnel 432 based on the first cVM's default forwarding rule. Upon receiving the ARP request at 404, the virtual switch or public cloud network gateway 412 can resolve the requested network address information such as by looking up the requested network address in the switch's ARP cache to identify the MAC address of the second cVM 418*b*. The switch 412 can also retrieve the second cVM's security information, such as keys, credentials, certificates, or other information necessary for establishing a DCT with the second cVM 418*b*. Keys, credentials, or certificates can include passwords, private keys generated from public-key cryptography methods (e.g., Rivest-Shamir-Adleman (RSA), Digital Signature Algorithm (DSA), Elliptical Curve Digital Signature Algorithm (ECDSA), Diffie-Helman (DH), Elliptic Curve Diffie-Hellman (ECDH)), or secret keys generated from symmetric-key cryptography methods (e.g., International Data Encryption Algorithm (IDEA), Data Encryption Standard (DES), Triple-DES, Advanced Encryption Standard (AES), ARCFOUR (RC4), Blowfish, Twofish, Carlisle Adams Stafford Tavares (CAST), etc. In various example embodiments, other authentication methods (e.g., Kerberos, NT LAN Manager (NTLM), and keyboard-interactive, etc.), and new authentication methods as they become available. The switch 412 can send the ARP reply to the first cVM 418*a* over the default tunnel 432. The DCT configuration information can be piggybacked onto the ARP reply.

The virtual switch 412 can also fetch the security policy rules relevant to the second cVM 418*b* and may send the security policies to the second cVM's control interface at 406. At 408, after the first cVM 418*a* has received the ARP reply and the second cVM's security information, the first cVM can begin the DCT establishment process or protocol by sending a DCT connection request to the second cVM 418*b* over the control tunnel 444. The DCT connection request can include information for authenticating the first cVM 418*a* derived from the second cVM's security information, as well as keys, credentials, certificates, or other information necessary to establish a DCT with the first cVM.

At 410, after the second cVM 418*b* can receive the security policies from the virtual switch 412 and the DCT connection request from the first cVM 418*a*, the second cVM may attempt to authenticate the first cVM using the first cVM's authentication information within the DCT connection request. Upon authentication of the first cVM 418*a*, the second cVM 418*b* can establish itself as one endpoint of the DCT 434, such as by updating its ingress security policy table using the received security policies. The second cVM 418*b* may then send a DCT connection reply that includes information authenticating the second cVM with information derived from the first cVM's security information. As a part of the DCT establishment process or protocol, the second cVM 418b may also update its egress forwarding table with an entry for forwarding egress traffic to the first cVM 418a through the DCT 434.

At 413, after the first cVM 418a has received the DCT connection reply, the first cVM may attempt to authenticate the second cVM 418b using the second cVM's authentication information within the DCT connection reply. If the second cVM 418b is authenticated, the first cVM 418a may establish itself as the other endpoint of the DCT 434, such as by updating its egress forwarding policy table with an entry forwarding traffic to the second cVM through the DCT. The first cVM 418a may subsequently send its application traffic directly to the second cVM 418b via the DCT 434 at 414, and the second cVM 418b can send its application traffic directly to the first cVM 418a via the DCT 434 at 416.

Figure 5:
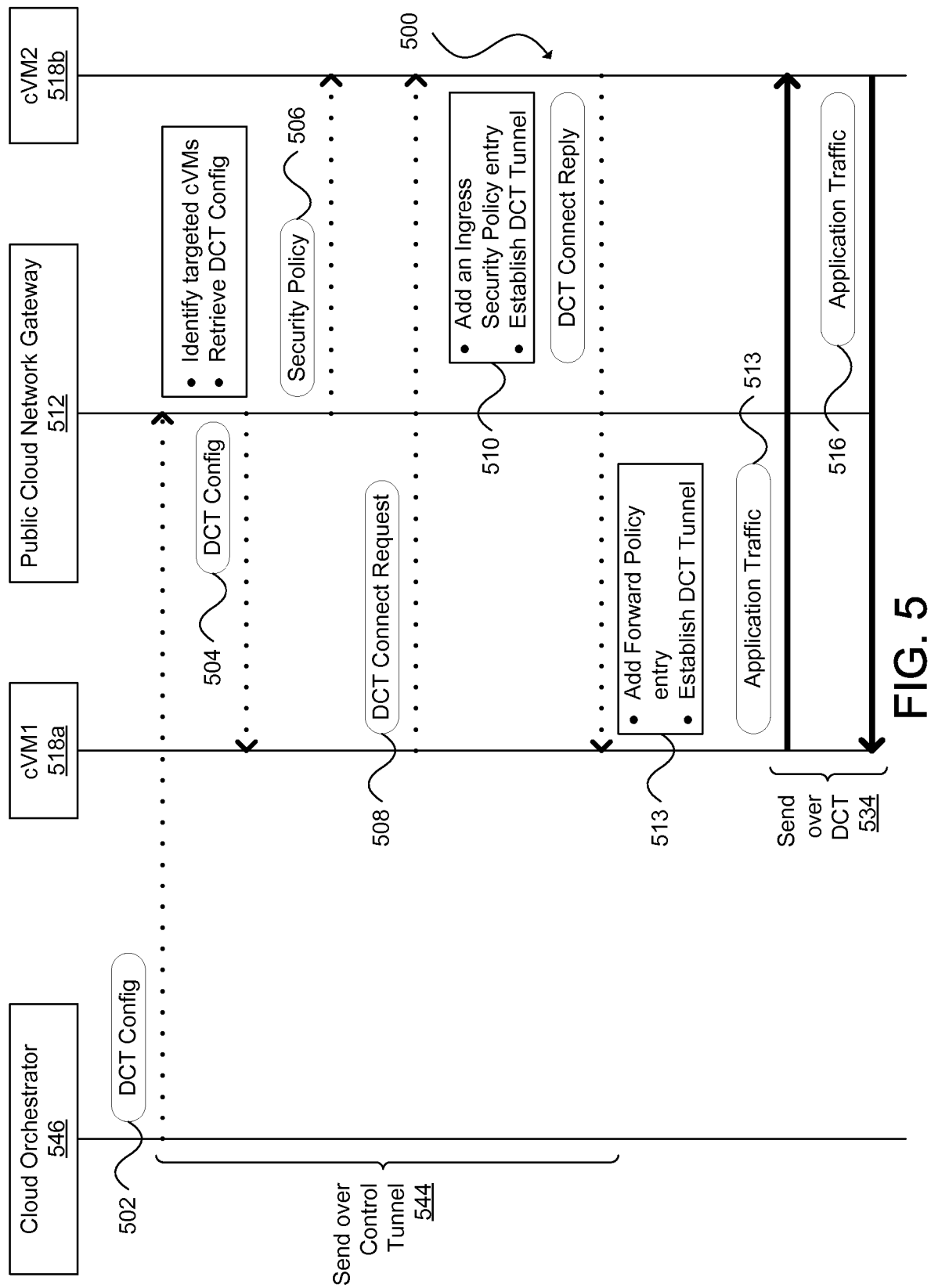
FIG. 5 illustrates an example data flow diagram for establishing communications between virtual machines in a hybrid cloud environment that can be utilized in another example embodiment.

FIG. 5 illustrates an example data flow diagram 500 for establishing communications between VMs in a hybrid cloud environment that can be utilized in another example embodiment. Data flow diagram 500 may be used for enforcing an application-driven DCT policy. For instance, instead of being acted upon according to real-time cVM-to-cVM traffic, such as in the case with an on-demand or statistics-driven DCT policy, an application-driven policy may be based on ANPs or application network requirements. Thus, it may be required to have prior knowledge of the application-level network topology and security requirements of an application before its deployment. Another difference between data flow diagrams 400 and 500 may lie in the first few steps of each process. That is 502 and 504 of the data flow diagram 500 may differ from 402 and 404 of the data flow diagram 400 but 506 through 516 of the data flow diagram 500 may be the same or substantially similar to 406 through 416 of the data flow diagram 400.

The data flow diagram 500 may begin by defining an ANP based on prior knowledge of the application's network and security requirements. The ANP can include configuration of endpoints (e.g., network and security policies) and security information (e.g., keys, credentials, certificates, or other authentication information. A cloud orchestration component 546 (e.g., the VSM 114 of FIG. 1, cloud manager 120 of FIG. 1, hypervisor manager 122 of FIG. 1, or other management interface) can be used to push the ANP to a virtual switch or public cloud network gateway 512 over a control tunnel 544 at 502. In another example embodiment, the ANP can be sent through a secure access tunnel. Based on receiving the ANP from the cloud orchestrator 546, the virtual switch 512 can build one or more DCT tunnels 534 between various VM pairs (e.g., cVMs 518a and 518b) one-by-one until each application node, configured to bypass the virtual switch according to the ANP, is connected to a DCT. For example, the virtual switch 512 can send DCT configuration to one or more cVMs over the control tunnel 544. In another example embodiment, the DCT configuration information can be sent over a secure access tunnel. As discussed, 506 through 516 can be the same or substantially the same as 406 through 416 of FIG. 4.

Figure 6:
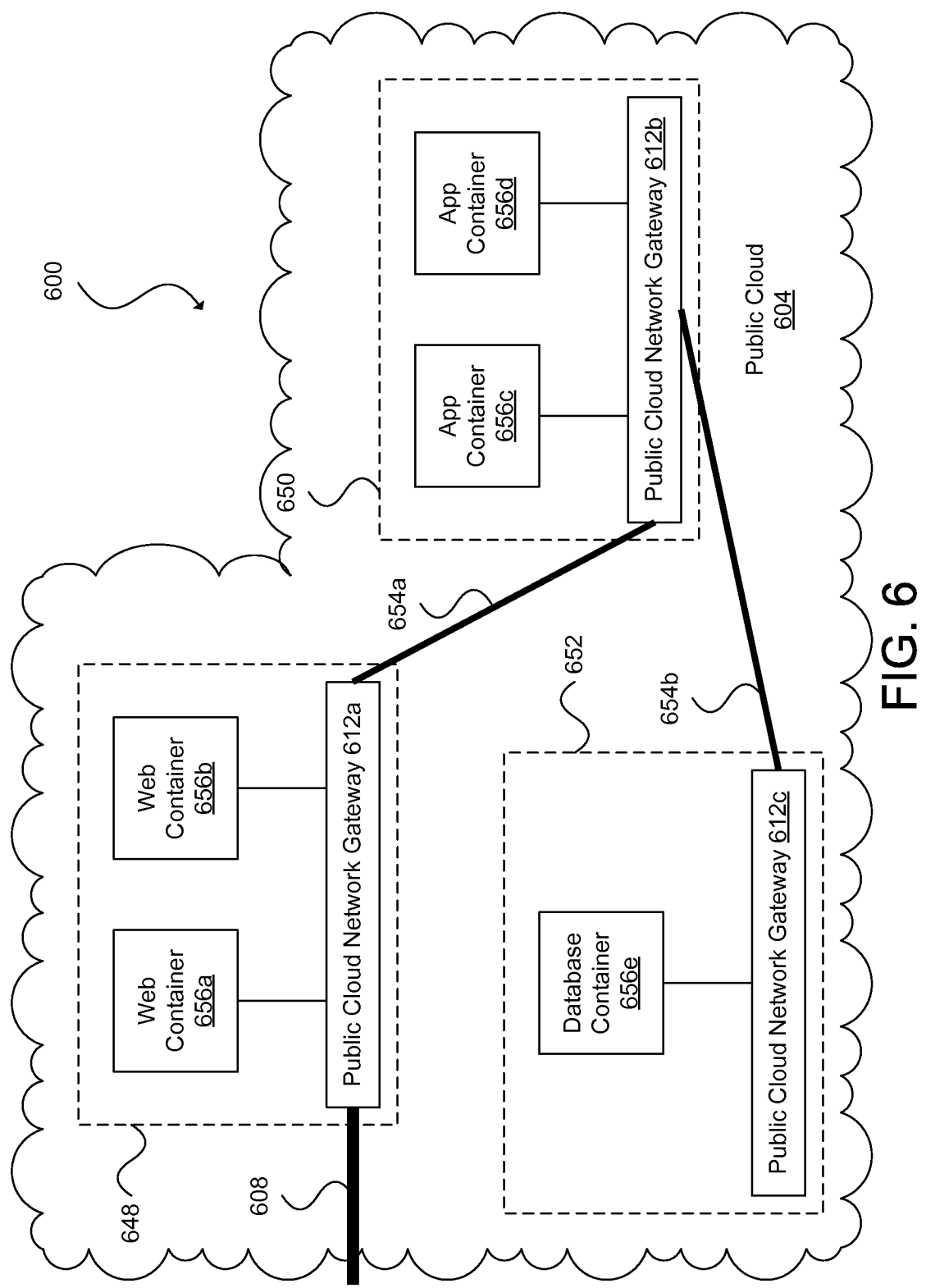
FIG. 6 an example hybrid cloud network environment that can be utilized in another example embodiment.

FIG. 6 illustrates an example hybrid cloud network environment 600 that can be utilized in another example embodiment. The hybrid cloud network environment 600 can include a private cloud (e.g., private cloud 102 of FIG. 1) (not shown) interconnected to a public cloud 604 via a secure network extension or site-to-site tunnel 608. The public cloud 604 can comprise a plurality of hosts, such as a web host 648, an application host 650, and a database host 652. Each host can be implemented as a virtual machine or a bare metal host. The web host 648 can include a public cloud network gateway 612a that interconnects the host to the private cloud by the secure site-to-site tunnel 608. The public cloud network gateway 612a can also interconnect the web host 648 to the application host 650 by a secure inter-gateway tunnel 654a.

The web host 648 can also include web containers 656a and 656b. In an example embodiment, the public cloud network gateway 612a can also be implemented as a container. A container is a kind of lightweight virtual machine utilized in operating system level virtualization. Operating system level virtualization is a type of server virtualization in which the kernel of an operating system may be capable of providing multiple isolated user space instances or containers. Unlike whole system server virtualization, in which a single server can host multiple operating systems, operating system level virtualization can be used to partition a single operating system among multiple containers. Containers may use less memory and CPU than whole system VMs running similar workloads because only a single kernel may be executed using containers whereas multiple kernels may be executed using whole system VMs. However, containers can raise security concerns not applicable to whole system VMs due to operating system resources being shared.

The application host 650 can include a public cloud network gateway 612b and application containers 656c and 656d. The public cloud network gateway 612b can be used to interconnect the application host 650 to the web host 648 via the secure inter-gateway tunnel 654a, and the application host 650 to the database host 652 via the secure inter-gateway tunnel 654b. The database host 652 can include a public cloud network gateway 612c and database container 656e. As illustrated in FIG. 6, the public cloud 604 can be used to implement a conventional multi-tier or three-tier architecture including a web or presentation tier corresponding to the web host 648, an application or logic tier corresponding to the application host 650, and a data or database tier corresponding to the database host 652.

In the example embodiment of FIG. 6, one or more application-driven DCT policies can be applied to the public cloud network 604 to create the multi-tier application architecture and the secure inter-gateway tunnels 654a and 654b. Using this approach, the public cloud network gateways can provide default network connectivity to every container (e.g., via access tunnels) while optimizing network traffic flow by using the DCTs as a primary data path for exchanging application traffic.

Figure 7A:
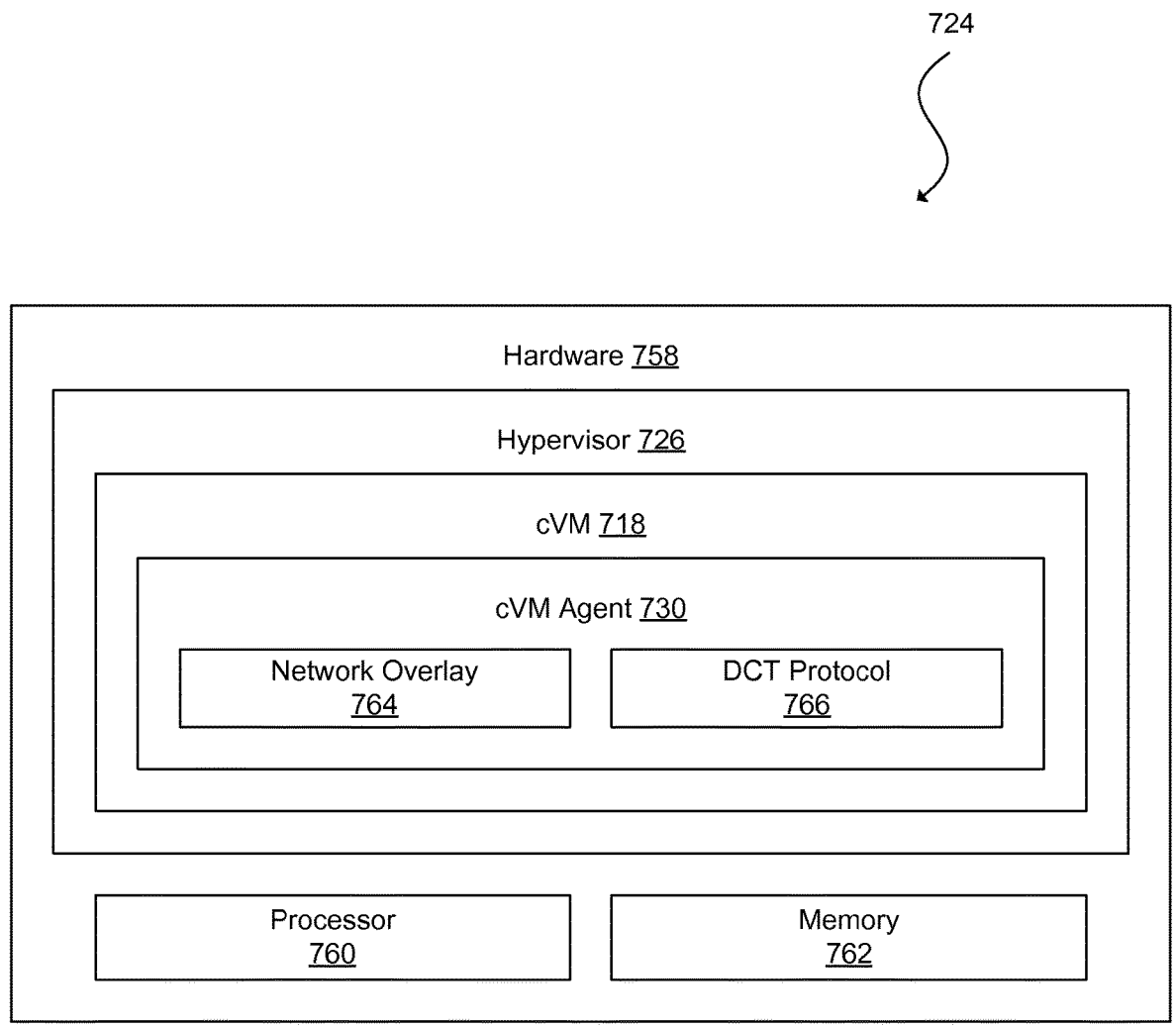
FIGS. 7A and 7B illustrate example systems that can be used in various example embodiments.

FIG. 7A illustrates an example embodiment of a physical server 724, such as physical server 124 of FIG. 1. The physical server 724 can include hardware 758, a hypervisor 726 (e.g., hypervisor 126 of FIG. 1), and a public cloud virtual machine 718 (e.g., cVM 118 of FIG. 1). Hardware 758 can represent any machine or apparatus capable of accepting, performing logic operations on, storing, or displaying data, and may include a processor 760 and memory 762. In this example embodiment, a cVM agent 730 (e.g., cVM agent 230 of FIG. 2) can be installed on the cVM 718 when the cVM is deployed on the physical server 724. The cVM agent 730 can include software, such as a network overlay module 764 and a DCT protocol module 766. The network overlay module 764 can be used to provide a compute environment and network overlay for the cVM 718, and can include logic for establishing a secure tunnel (e.g., access tunnel 332 of FIG. 3) to connect the cVM 718 to a public cloud network gateway (not shown). The DCT protocol module 766 can include logic for performing the DCT protocol or process discussed with respect to FIGS. 4 and 5. The memory 762 can be used to store an egress forwarding policy table, such as egress forwarding policy table 336 of FIG. 3, and an ingress security policy table, such as ingress security policy table 338 of FIG. 3.

Figure 7B:
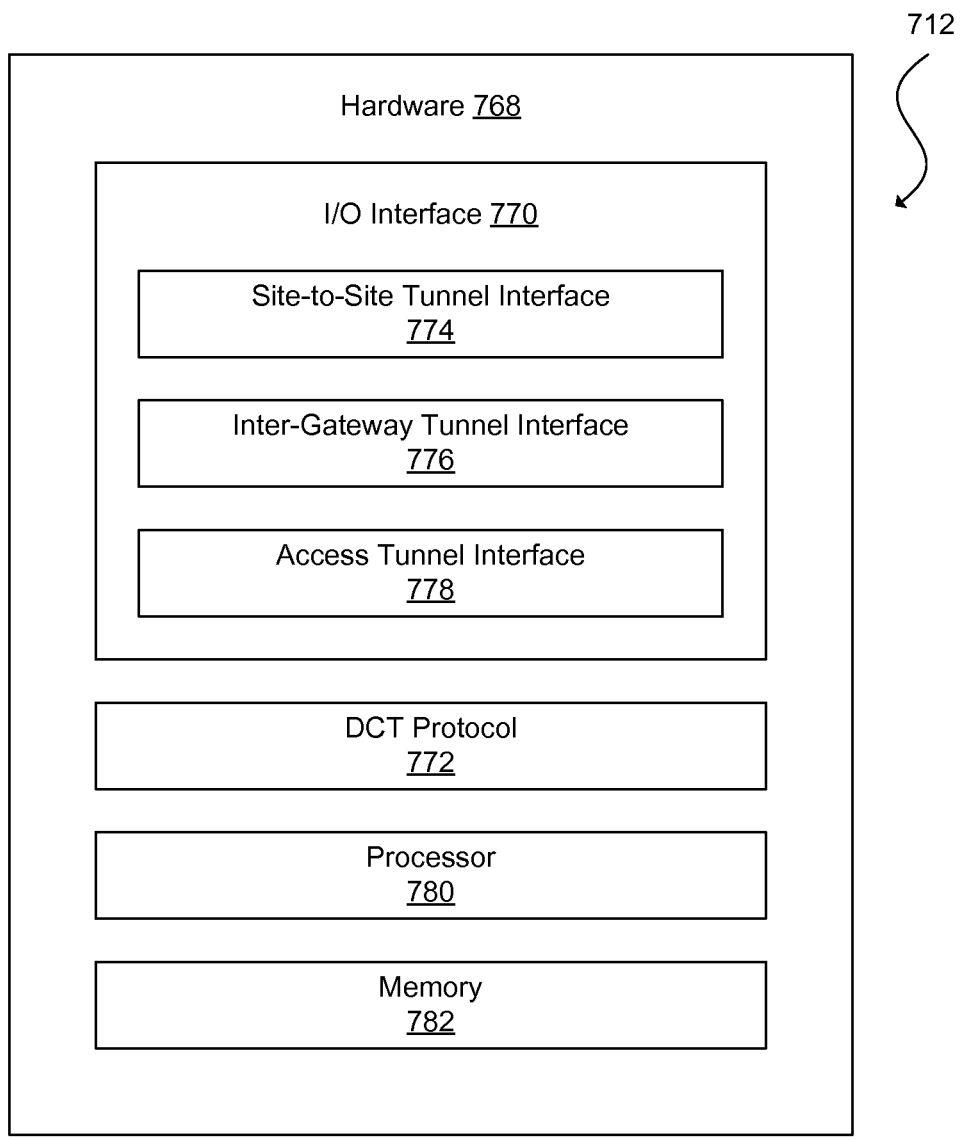

FIG. 7B illustrates an example embodiment of a public cloud network gateway 712, such as the public cloud network gateway 112 of FIG. 1. The public cloud network gateway 712 can include hardware 768 and public cloud network gateway software, such as an Input/Output (I/O) interface 770 and a DCT protocol module 772. I/O interface 770 can enable the public cloud network gateway 712 to communicate with components located within the same public cloud as the gateway, as well as with other public cloud network gateways and with a private cloud (e.g., private cloud 102 of FIG. 1) (not shown).

I/O interface 770 can include a site-to-site tunnel interface 774, an inter-gateway tunnel interface 776, and an access tunnel interface 778. Site-to-site tunnel interface 774 can be used by the public cloud network gateway 712 to communicate with a private cloud network gateway (e.g., private cloud network gateway 110 of FIG. 1) (not shown) over a secure site-to-site tunnel, such as secure site-to-site tunnel 108 of FIG. 1. Inter-gateway tunnel interface 776 can be used by the public cloud network gateway 712 to communicate with other public cloud network gateways over inter-gateway tunnels, such as inter-gateway tunnels 654*a* and 654*b* of FIG. 6. Access tunnel interface 778 can be used by the public cloud network gateway 712 to communicate with cVMs (e.g., cVM 718) over secure access tunnels, such as access tunnel 332 of FIG. 3 or over an overlay network, such as a VXLAN, NVGRE, NVO3, STT, or other overlay network.

The DCT protocol module 772 can include logic for performing the DCT protocol or process discussed with respect to FIGS. 4 and 5. Hardware 768 can represent any machine or apparatus that is capable of accepting, performing logic operations on, storing, or displaying data, and may include a processor 780 and memory 782. Memory 782 can include, for example, a hash map, table, or other suitable data structure for storing the network address information of cVMs in the public cloud, such as an ARP cache, a cVM MAC address-to-VEM IP address mapping, a forwarding table, or other network address data structure. Memory 782 can also include a database or other suitable data structure for storing DCT configuration information, including security policies and security information (e.g., keys, credentials, certificates, or other authentication information) for each cVM attached to the public cloud network gateway 712. Memory 782 can further include one or more tables, lists, or other data structures for storing data associated with certain operations described herein.

In an example embodiment, the public cloud network gateway 712, physical server 724, and/or physical switches connected to these components (not shown) can be network elements, which can encompass network appliances, servers, routers, switches, firewalls gateways, bridges, load balancers, modules, or any other suitable device, proprietary component, element, or object operable to exchange information in a network environment. Network elements may include any suitable hardware, software, components, modules, or objects that facilitate the operations thereof, as well as suitable interfaces for receiving, transmitting, and/or otherwise communicating data or information in a network environment. This may be inclusive of appropriate algorithms and communication protocols that allow for the effective exchange of data or information.

In regards to the internal structure associated with the above network elements, each of the public cloud network gateway 712, physical server 724, and/or a physical switches connected to these components (not shown) can include memory elements for storing information to be used in the operations disclosed herein. Additionally, physical server 724 may also include virtual memory elements for storing information associated with virtual partitions, such as public cloud virtual machine 718. Each of VSM 702, virtualized system 706, VEM 714, and/or a connected physical switch may keep information in any suitable memory element (e.g., random access memory (RAM), read-only memory (ROM), erasable programmable ROM (EPROM), electrically erasable programmable ROM (EEPROM), application specific integrated circuit (ASIC), etc.), software, hardware, or in any other suitable component, device, element, or object where appropriate and based on particular needs. Any of the memory elements discussed herein (e.g., memory 762 and 782) should be construed as being encompassed within the broad term memory element or memory. Information being used, tracked, sent, or received by each of the public cloud network gateway 712, physical server 724, and/or a connected physical switch can be provided in any database, register, queue, table, cache, control list, or other storage structure, all of which can be referenced at any suitable timeframe. Any such storage options may be included within the broad term memory element or memory as used herein.

In an example embodiment, each of the public cloud network gateway 712, physical server 724, and/or a connected physical switch may include software modules (e.g., DCT protocol) to achieve, or to foster operations as outlined herein. In other example embodiments, such operations may be carried out by hardware, implemented externally to these elements, or included in some other network device to achieve the intended functionality. Alternatively, these elements may include software (or reciprocating software) that can coordinate in order to achieve the operations, as outlined herein. In still other embodiments, one or all of these devices may include any suitable algorithms, hardware, software, components, modules, interfaces, or objects that facilitate the operations thereof.

For clarity of explanation, in some instances the subject matter of this disclosure may be presented as including individual functional blocks including functional blocks comprising devices, device components, steps or routines in a method embodied in software, or combinations of hardware and software.

Note that in certain example embodiments, the optimization and/or switch overlay bypass functions outlined herein may be implemented by logic encoded in one or more tangible, non-transitory media (e.g., embedded logic provided in an application specific integrated circuit (ASIC), digital signal processor (DSP) instructions, software (potentially inclusive of object code and source code) to be executed by a processor, or other similar machine, etc.). The computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described example embodiments can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to the subject matter of this disclosure can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A method comprising:
receiving, by a first virtual machine from a virtual switch via a secure access tunnel that includes a hop over the virtual switch, configuration information for establishing a second virtual machine as a second endpoint of a direct tunnel without the hop over the virtual switch, wherein the configuration information includes second security information of the second virtual machine, the virtual switch is a public cloud network gateway, and the first virtual machine is configured by the public cloud network gateway with a default rule to cause the first virtual machine to initially default to the secure access tunnel with the hop over the public cloud network gateway during initial deployment of the first virtual machine;
sending, from the first virtual machine to the second virtual machine, a request to connect to the second virtual machine via the direct tunnel, wherein the request includes first security information of the first virtual machine and first authentication information of the first virtual machine derived from the second security information;
receiving, by the first virtual machine from the second virtual machine, a reply that includes second authentication information of the second virtual machine derived from the first security information;
establishing the first virtual machine as a first endpoint of the direct tunnel;
sending first network traffic from the first virtual machine to the second virtual machine via the direct tunnel; and
receiving second network traffic by the first virtual machine from the second virtual machine via the direct tunnel.

2. The method of claim 1, further comprising:
adding an entry to an egress forwarding policy table of the first virtual machine to forward network traffic via the secure access tunnel; and
sending, from the first virtual machine via the secure access tunnel, an Address Resolution Protocol (ARP) request targeting the second virtual machine.

3. The method of claim 1, further comprising:
sending the configuration information from a cloud orchestrator to the virtual switch to cause the virtual switch to send the configuration information to the first virtual machine.

4. The method of claim 3, wherein the cloud orchestrator includes a cloud manager and a hypervisor manager.

5. The method of claim 1, further comprising:
receiving, by the second virtual machine from the virtual switch, one or more security policies corresponding to the second virtual machine;
receiving, by the second virtual machine from the first virtual machine, the request to connect to the second virtual machine via the direct tunnel;
establishing the second virtual machine as the second endpoint of the direct tunnel;
sending, from the second virtual machine to the first virtual machine, the reply that includes the second authentication information;
receiving the first network traffic by the second virtual machine from the first virtual machine via the direct tunnel; and
sending the second network traffic from the second virtual machine to the first virtual machine via the direct tunnel.

6. The method of claim 5, further comprising:
adding one or more first entries to an ingress security policy table of the second virtual machine based at least in part on the one or more security policies; and
adding a second entry to an egress forwarding policy table of the second virtual machine to forward network traffic destined for the first virtual machine via the direct tunnel.

7. The method of claim 5, wherein the one or more security policies, the request, and the reply are transceived via a control tunnel.

8. The method of claim 1, further comprising:
adding an entry to an egress forwarding policy table of the first virtual machine to forward network traffic destined for the second virtual machine via the direct tunnel.

9. The method of claim 1, further comprising:
installing a virtual machine agent onto the first virtual machine for establishing the direct tunnel.

10. The method of claim 1, further comprising:
applying a policy for establishing the direct tunnel.

11. The method of claim 10, wherein the policy includes at least one of an on-demand policy, an application-driven policy, or a statistics-driven policy.

12. A non-transitory computer-readable storage medium having stored therein instructions that, upon being executed by a processor, cause the processor to:

send, by a virtual switch to a first virtual machine via a secure access tunnel that includes a hop over the virtual switch, configuration information for establishing a second virtual machine as an endpoint of a direct tunnel without the hop over the virtual switch, wherein the configuration information includes second security information corresponding to the second virtual machine, the virtual switch is a public cloud network gateway, and the first virtual machine is configured by the public cloud network gateway with a default rule to cause the first virtual machine to initially default to the secure access tunnel with the hop over the public cloud network gateway during initial deployment of the first virtual machine;

send, from the virtual switch to the second virtual machine, one or more security policies corresponding to the second virtual machine;

cause, by the virtual switch, the first virtual machine to send to the second virtual machine a request for connecting to the second virtual machine via the direct tunnel, wherein the request includes first authentication information of the first virtual machine derived from the second security information and first security information corresponding to the first virtual machine;

cause, by the virtual switch, the second virtual machine to send to the first virtual machine a reply that includes second authentication information of the second virtual machine derived from the first security information; and establish the direct tunnel between the first virtual machine and the second virtual machine.

13. The non-transitory computer-readable storage medium of claim 12, wherein the instructions upon being executed further cause the processor to:

receive, by the virtual switch from the first virtual machine, an Address Resolution Protocol (ARP) request targeting the second virtual machine; and resolve, by the virtual switch, network address information of the second virtual machine, wherein the configuration information is sent as a part of an ARP reply that includes the network address information of the second virtual machine.

14. The non-transitory computer-readable storage medium of claim 12, wherein the instructions upon being executed further cause the processor to:

receive, by the virtual switch from a cloud orchestrator, the configuration information for establishing the second virtual machine as the endpoint of the direct tunnel, wherein the cloud orchestrator includes a cloud manager and a hypervisor manager.

15. The non-transitory computer-readable storage medium of claim 14, wherein the configuration information, the one or more security policies, the request, and the reply are transceived via a control tunnel.

16. The non-transitory computer-readable storage medium of claim 12, wherein the virtual switch is connected to a second virtual switch, the first virtual machine is directly connected to the virtual switch, and the second virtual machine is directly connected to the second virtual switch.

17. A system comprising:
one or more processors; and
memory including instructions that, upon being executed by the one or more processors, cause the system to:
receive, by a first virtual machine from a virtual switch via a secure access tunnel that includes a hop over the virtual switch, configuration information for establishing a second virtual machine as a second endpoint of a direct tunnel without the hop over the virtual switch, wherein the configuration information includes second security information of the second virtual machine, the virtual switch is a public cloud network gateway, and the first virtual machine is configured by the public cloud network gateway with a default rule to cause the first virtual machine to initially default to the secure access tunnel with the hop over the public cloud network gateway during initial deployment of the first virtual machine;

send, from the first virtual machine to the second virtual machine, a request to connect to the second virtual machine via the direct tunnel, wherein the request includes first security information of the first virtual machine and first authentication information of the first virtual machine derived from the second security information;

receive, by the first virtual machine from the second virtual machine, a reply that includes second authentication information of the second virtual machine derived from the first security information;

establish the first virtual machine as a first endpoint of the direct tunnel;

send first network traffic from the first virtual machine to the second virtual machine via the direct tunnel; and receive second network traffic by the first virtual machine from the second virtual machine via the direct tunnel.

18. The system of claim 17, wherein the instructions upon being executed further cause the system to:

receive, by the second virtual machine from the virtual switch, one or more security policies corresponding to the second virtual machine;

receive, by the second virtual machine from the first virtual machine, the request to connect to the second virtual machine via the direct tunnel;

establish the second virtual machine as the second endpoint of the direct tunnel;

send, from the second virtual machine to the first virtual machine, the reply that includes the second authentication information;

receive the first network traffic by the second virtual machine from the first virtual machine via the direct tunnel; and send the second network traffic from the second virtual machine to the first virtual machine via the direct tunnel.

19. The system of claim 18, wherein the instructions upon being executed further cause the system to:

add one or more first entries to an ingress security policy table of the second virtual machine based at least in part on the one or more security policies; and add a second entry to an egress forwarding policy table of the second virtual machine to forward network traffic destined for the first virtual machine via the direct tunnel.

20. The system of claim 17, wherein the instructions upon being executed further cause the system to:

add an entry to an egress forwarding policy table of the first virtual machine to forward network traffic via the secure access tunnel; and send, from the first virtual machine via the secure access tunnel, an Address Resolution Protocol (ARP) request targeting the second virtual machine.

* * * * *